United States Patent
Kobayashi et al.

(10) Patent No.: US 7,984,076 B2
(45) Date of Patent: *Jul. 19, 2011

(54) DOCUMENT PROCESSING APPARATUS, DOCUMENT PROCESSING METHOD, DOCUMENT PROCESSING PROGRAM AND RECORDING MEDIUM

(75) Inventors: Kenichiro Kobayashi, Tokyo (JP); Makoto Akabane, Tokyo (JP); Tomoaki Nitta, Tokyo (JP); Nobuhide Yamazaki, Tokyo (JP); Erika Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 321 days.

This patent is subject to a terminal disclaimer.

(21) Appl. No.: 12/005,924

(22) Filed: Dec. 28, 2007

(65) Prior Publication Data

US 2008/0256120 A1  Oct. 16, 2008

Related U.S. Application Data

(63) Continuation of application No. 11/185,303, filed on Jul. 20, 2005, now Pat. No. 7,315,867, which is a continuation of application No. 10/143,279, filed on May 10, 2002, now Pat. No. 7,111,011.

(30) Foreign Application Priority Data

May 10, 2001  (JP) ................................. 2001-140778

(51) Int. Cl.
*G06F 7/00* (2006.01)
*G06F 17/30* (2006.01)

(52) U.S. Cl. ......... 707/803; 707/812; 715/208; 715/234

(58) Field of Classification Search ................ 707/1–10, 707/100–104.1, 200–206, 600–831; 715/230, 715/234, 248, 249, 272, 205–209
See application file for complete search history.

(56) References Cited

U.S. PATENT DOCUMENTS 4,876,665 A  10/1989  Iwai et al.
(Continued)

FOREIGN PATENT DOCUMENTS

JP  05-110805  4/1993
(Continued)

OTHER PUBLICATIONS

Bertino et al., Integrating XML and databases, Jul./Aug. 2001, vol. 5, 84-88.*

(Continued)

*Primary Examiner* — Jean B Fleurantin
(74) *Attorney, Agent, or Firm* — Wolf, Greenfield & Sacks, P.C.

(57) ABSTRACT

The text format of input data is checked, and is converted into a system-manipulated format. It is further determined if the input data is in an HTML or e-mail format using tags, heading information, and the like. The converted data is divided into blocks in a simple manner such that elements in the blocks can be checked based on repetition of predetermined character patterns. Each block section is tagged with a tag indicating a block. The data divided into blocks is parsed based on tags, character patterns, etc., and is structured. A table in text is also parsed, and is segmented into cells. Finally, tree-structured data having a hierarchical structure is generated based on the sentence-structured data. A sentence-extraction template paired with the tree-structured data is used to extract sentences.

50 Claims, 47 Drawing Sheets

U.S. PATENT DOCUMENTS

| | | | |
|---|---|---|---|
| 5,438,657 | A | 8/1995 | Nakatani |
| 5,778,400 | A | 7/1998 | Tateno |
| 5,812,999 | A | 9/1998 | Tateno |
| 6,014,680 | A | 1/2000 | Sata et al. |
| 6,088,709 | A | 7/2000 | Watanabe |
| 6,247,018 | B1 | 6/2001 | Rheaume |
| 6,343,287 | B1 | 1/2002 | Kumar et al. |
| 6,424,982 | B1 | 7/2002 | Vogel |
| 6,741,985 | B2 | 5/2004 | Green |
| 6,963,830 | B1 | 11/2005 | Nakao |
| 6,981,218 | B1 | 12/2005 | Nagao |
| 7,099,826 | B2 | 8/2006 | Akabane et al. |
| 2002/0143823 | A1* | 10/2002 | Stevens .................... 707/523 |

FOREIGN PATENT DOCUMENTS

| | | |
|---|---|---|
| JP | 11-353218 | 12/1999 |

OTHER PUBLICATIONS

Tuong Dao, An indexing model for structured documents to support queries on content, structure and attributes, Apr. 22-24, 1998, 88-97.*

Bertino et al., Integrating XML and databases, Jul./Aug. 2001, IEEE, vol. 5, 84-88.*

Tuong Dao, An indexing model for structured documents to support queries on content, structure and attributes, Apr. 22-24, 1998, IEEE, 88-97.*

Jyh-herng Chow et al., Index design for structured documents based on Abstraction, Apr. 1999, IEEE, 89-96.

H. Ouahid et al., Converting web pages into well-formed xml documents, Jun. 1999, IEE, 676-680.

Uchida, Akihiro, plain2 User Guide, [online], Dec. 6, 2000, r2.5, pp. 1-61, [Searched on Sep. 28, 2010], Internet <URL: http://web.archive.org/web/20001206125100/http://shika.aist-narca.ac.jp/products/DEST/plain2/plain2-2.53.tar.gz, plain2-2.53.tar/plain2/doc/plain2.ps>.

* cited by examiner

FIG. 7A

⋮ shown in the following table:

| Weight | Length | Price |
|--------|--------|-------|
| 10 | 20 | 30 |

Therefore, ....

⋮ shown in the following table:
</TC_TSF_BLOCK>
<TC_TSF_BLOCK type=7>

| Weight | Length | Price |
|--------|--------|-------|
| 10 | 20 | 30 |

</TC_TSF_BLOCK>
<TC_TSF_BLOCK type=0>
Therefore, ....

| TYPE | CHARACTER PATTERN |
|---|---|
| ⋮ | ⋮ |
| 7 | ─ │ ┌ ┐ ┘ └ ┤ ┬ ┴ ┼ |
| 8 | ─ │ ┌ ┐ ┘ └ ├ ┬ ┤ ┴ ┼ |
| 9 | ╱ ‾ _ ‐ ╲ │ |
| ⋮ | ⋮ |

FIG. 9A

```
       :
       :
shown in the following table:
+--------------------------------+
| Weight | Length |  Price  |
+--------------------------------+
|   10   |   20   |   30    |
+--------------------------------+
Therefore, ....
       :
       :
```

FIG. 9B

```
       :
       :
shown in the following table:
</TC_TSF_BLOCK>
<TC_TSF_BLOCK type=10>
+--------------------------------+
| Weight | Length |  Price  |
+--------------------------------+
|   10   |   20   |   30    |
+--------------------------------+
</TC_TSF_BLOCK>
<TC_TSF_BLOCK type=0>
Therefore, ....
       :
       :
```

FIG. 10

| REGISTERED CHARACTER | MINIMUM NUMBER |
|---|---|
| + − | 1 |
| − + | 1 |
| − | 2 |
| \| | 1 |
| * | 1 |
| = = | 2 |
| ~ | 2 |
| ⋮ | ⋮ |

The description is completed now.
The following is an appendix.
---------------------------------------------
APPENDIX
Japanese Economic Outlook for Next Year

The description is completed now.
The following is an appendix.
</TC_TSF_BLOCK>
<TC_TSF_BLOCK type=1>
---------------------------------------------
</TC_TSF_BLOCK>
<TC_TSF_BLOCK type=0>
APPENDIX
Japanese Economic Outlook for Next Year

| TYPE | CHARACTER PATTERN |
|---|---|
| ⋮ | ⋮ |
| 1 | ー ＊ ＝ ＋ ・ ＜ ＞ 〜 |
| 2 | ⋮ |
| 3 | ⋮ |
| ⋮ | ⋮ |

FIG. 13A

Hello. Wasn't the weather nice today.
Let's go to see the cherry trees when they blossom.

By the way, I'm mailing you about the trip
of next week.

FIG. 13B

```
<TC_TSF_BLOCK type=0>
Hello. Wasn't the weather nice today.
Let's go to see the cherry trees when they blossom.
</TC_TSF_BLOCK>

<TC_TSF_BLOCK type=0>
By the way, I'm mailing you about the trip
of next week.
</TC_TSF_BLOCK>
```

The description is completed now.
The following is an appendix.
=====================
★★★★★★★★
 APPENDIX
★★★★★★★★
Japanese Economic Outlook for Next Year

The description is completed now.
The following is an appendix.
</TC_TSF_BLOCK>
<TC_TSF_BLOCK type=101 tag=HR>
=====================
</TC_TSF_BLOCK>
<TC_TSF_BLOCK type=101 tag=HEAD>
★★★★★★★★
 APPENDIX
★★★★★★★★
</TC_TSF_BLOCK>
<TC_TSF_BLOCK type=0>
Japanese Economic Outlook for Next Year

| STARTING PATTERN | END PATTERN | MAX NUMBER OF LINES | DEFINED TAG |
|---|---|---|---|
| ^(★★) | (★★)$ | 5 | <HEAD> |
| ^(☆☆) | (☆☆)$ | 5 | <HEAD> |
| ^([¥-=]) + [A-Z] | [A-Z] + ([¥-=]) + $ | 1 | <HR> |
| ^==¥*==¥* | ¥*==¥*==$ | 1 | <HR> |
| ⋮ | ⋮ | ⋮ | |

FIG. 16A

```
         .
         .
         .
<P>
This is a membership list.
</P>
<!-- Start of Name -->
<P>
<a href ="abc/def/ghi">JOHN DOE</a>
<a href ="abc/def/ghi">JANE DOE</a>
         .
         .
         .
```

FIG. 16B

```
         .
         .
         .
<P>
This is a membership list.
</P>
<P>
JOHN DOE
JANE DOE
         .
         .
         .
```

FIG. 17

| TAG USED | TAG DELETED |
|---|---|
| <H> | <A> |
| <TABLE> | <FONT> |
| <TR> | <IMG> |
| <TD> | <APPLET> |
| <HR> | <!-- --> |
| <BODY> | ⋮ |
| <BR> | |
| <CENTER> | |
| ⋮ | |

FIG. 18A

Hello. Wasn't the weather nice today.
Let's go to see the cherry trees when they blossom.
By the way, I'm mailing you about the trip
of next week.

```
<TC_TSF_BLOCK cols=50 type=0>
<pos=0 top=0 left=0 right=36>Hello. Wasn't the weather nice today.
<pos=38 top=1 left=0 right=50>Let's go to see the cherry trees when they blossom.
<pos=90 top=2 left=0 right=42>By the way, I'm mailing you about the trip
<pos=134 top=3 left=0 right=13>of next week.
</TC_TSF_BLOCK>
```

```
       .
       .
       .
<TC_TSF_BLOCK type=0>
Hello. Wasn't the weather nice today.
Let's go to see the cherry trees when they blossom.

By the way, I'm mailing you about the trip
of next week.

```
       .
       .
       .
<TC_TSF_BLOCK type=0>
 Hello. Wasn't the weather nice today.
Let's go to see the <EM underline="-"> cherry trees</EM>
when they blossom.
By the way, I'm mailing you about the trip
of next week.
</TC_TSF_BLOCK>

```
         .
         .
         .
<TC_TSF_BLOCK type=0>
>Hello. Wasn't the weather nice today.
>Let's go to see the cherry trees when they blossom.
>By the way, I'm mailing you about the trip
>of next week.

Hi! It's been a long time.
         .
         .
         .
```

FIG. 22B

```
         .
         .
         .
<BLOCKQUOTE header=" > ">
<P>
<PRE>
Hello. Wasn't the weather nice today.
Let's go to see the cherry trees when they blossom.
By the way, I'm mailing you about the trip
of next week.
</PRE>
</P>
</BLOCKQUOTE>
<P>
<PRE>
Hi! It's been a long time.
         .
         .
         .
```

FIG. 24A

```
         :
         :
<TC_TSF_BLOCK type=0>
> Hello. Wasn't the weather nice today.
> Let's go to see the cherry trees when they blossom.
> By the way, I'm mailing you about the trip
> of next week.

Hi! It's been a long time.
         :
         :
```

FIG. 24B

```
         :
         :
<P>
<PRE>
<QUOTE>></QUOTE> Hello. Wasn't the weather nice today.
<QUOTE>></QUOTE> Let's go to see the cherry trees when they blossom.
<QUOTE>></QUOTE> By the way, I'm mailing you about the trip
<QUOTE>></QUOTE> of next week.
</PRE>
</P>
<P>
<PRE>
Hi! It's been a long time.
         :
         :
```

FIG. 25A

```
         .
         .
         .
<TC_TSF_BLOCK type=0>
◎ Question
   Who built the Osaka Castle?
   Select from the following items.
         .
         .
```

FIG. 25B

```
         .
         .
         .
<HEAD>
◎ Question
</HEAD>
<P>
<PRE>
   Who built the Osaka Castle?
   Select from the following items.
         .
         .
```

FIG. 27A

```
          ⋮
<TC_TSF_BLOCK type=0>
        Question
  Who built the Osaka Castle?
  Select from the following items.
          ⋮
```

FIG. 27B

```
          ⋮
<HEAD>
        Question
</HEAD>
<P>
<PRE>
  Who built the Osaka Castle?
  Select from the following items.
          ⋮
```

FIG. 28A

```
    ⋮
<TC_TSF_BLOCK type=0>
Question
   Who built the Osaka Castle?
   Select from the following items.

```
    ⋮
<HEAD>
Question
</HEAD>
<P>
<PRE>
   Who built the Osaka Castle?
   Select from the following items.

```
        ⋮
<TC_TSF_BLOCK type=0>
  [Question]
  Who built the Osaka Castle?
  Select from the following items.

```
        ⋮
<HEAD>
  [Question]
</HEAD>
<P>
<PRE>
  Who built the Osaka Castle?
  Select from the following items.

| NAME | PRICE | FEATURE |
|---|---|---|
| Software 1 | 20,000 YEN | Fast Processing but Low Precision. |
| Software 2 | 70,000 YEN | High Precision but Expensive. Slow. |
| Software 3 | 30,000 YEN | Fast. High Precision. Inexpensive. Not yet on Sale. |

```
<TABLE border="1">
    <TR>
        <TD>
            <P type="block">
                <blocktop>
                    <pos=49 top=1 left=5 right=8 eol=0>NAME
                </blocktop>
            </P>
        </TD>
        <TD>
            <P type="block">
                <blocktop>
                    <pos=49 top=1 left=18 right=22 eol=0>PRICE
                </blocktop>
            </P>
        </TD>
        <TD>
            <P type="block">
                <blocktop>
                    <pos=49 top=1 left=33 right=39 eol=0>FEATURE
                </blocktop>
            </P>
        </TD>
    </TR>
    <TR>
        <TD rowspan="3" >
            <P type="block">
                <blocktop>
                    <pos=196 top=4 left=2 right=11 eol=0>Software 1
                </blocktop>
            </P>
        </TD>
        <TD rowspan="3">
            <P type="block">
                <blocktop>
                    <pos=196 top=4 left=16 right=25 eol=0>20,000 YEN
                </blocktop>
            </P>
        </TD>
        <TD rowspan="3">
            <P type="block">
                <blocktop>
                    <pos=147 top=3 left=29  right=43 eol=1>Fast  Processing
                    <pos=196 top=4 left=29  right=46 eol=0>but  Low  Precision.
                </blocktop>
            </P>
```

```
    :
    :
The description is completed now.
The following is an appendix.
</TC_TSF_BLOCK>
<TC_TSF_BLOCK type=101 tag=HR>
========================
</TC_TSF_BLOCK>
<TC_TSF_BLOCK type=101 tag=HEAD>
* * * * * * * *
   APPENDIX
* * * * * * * *
</TC_TSF_BLOCK>
<TC_TSF_BLOCK type=0>
Japanese Economic Outlook for Next Year
    :
    :
```

FIG. 33B

```
    :
    :
The description is completed now.
The following is an appendix.
<HR>
========================
</HR>
<HEAD>
* * * * * * * *
   APPENDIX
* * * * * * * *
</HEAD>
<P>
<PRE>
Japanese Economic Outlook for Next Year
    :
    :
```

FIG. 34A

```
    .
    .
    .
<P>
<PRE>
Hello. Wasn't the weather nice today.
Let's go to see the cherry trees when they blossom.

By the way, I'm mailing you about the trip
of next week.
</PRE>
<P>
    .
    .
    .
```

FIG. 34B

```
    .
    .
    .
<P>
<PRE>
Hello. Wasn't the weather nice today.
Let's go to see the cherry trees when they blossom.
</PRE>
</P>
<P>
By the way, I'm mailing you about the trip
of next week.
</PRE>
</P>
    .
    .
    .
```

FIG. 35A

```
           :
           :
<TC_TSF_BLOCK type=0>
 The Prime Minister said in the Diet, "the Japanese
economy is recovering gradually, but it will take more
time until full-scale economic recovery is achieved.
<TC_TSF_BLOCK type=0>

</TC_TSF_BLOCK>
The government will continue to take countermeasures."
However, the request for a concrete policy came from
the Press.
</TC_TSF_BLOCK>
           :
           :
```

FIG. 35B

```
           :
           :
<TC_TSF_BLOCK type=0>
 The Prime Minister said in the Diet, "the Japanese
economy is recovering gradually, but it will take more
time until full-scale economic recovery is achieved.
The government will continue to take countermeasures."
However, the request for a concrete policy came from
the Press.
</TC_TSF_BLOCK>
           :
           :
```

FIG. 36A

```
          ⋮
<TC_TSF_BLOCK type=0>
  Hello. Wasn't the weather nice today.
Let's go to see the cherry trees when they blossom.
The cherry trees seem to blossom earlier this
year than usual.
  By the way, I'm mailing you about the trip
of next week.
          ⋮
```

FIG. 36B

```
          ⋮
<P>
<PRE>
  Hello. Wasn't the weather nice today.
Let's go to see the cherry trees when they blossom.
The cherry trees seem to blossom earlier this
year than usual.
</PRE>
</P>
<P>
<PRE>
  By the way, I'm mailing you about the trip
of next week.
          ⋮
```

FIG. 37A

```
...
<TC_TSF_BLOCK type=0>
Hello. Wasn't the weather nice today. Let's go to see the cherry trees
when they blossom.
The cherry trees seem to blossom earlier this year than usual.
By the way, I'm mailing you about the trip
of next week.
</TC_TSF_BLOCK>
...
```

FIG. 37B

```
...
<PRE>
<pos=0 top=0 left=0 right=5 eol=0>Hello.
</PRE>
<PRE>
<pos=0 top=0 left=7 right=36 eol=0>Wasn't the weather nice today.
</PRE>
<PRE><pos=0 top=0 left=38 right=69 eol=1>Let's go to see the cherry trees
<pos=71 top=1 left=0 right=17 eol=0>when they blossom.
</PRE>
<PRE>
<pos=90 top=2 left=0 right=61 eol=0>The cherry trees seem to blossom earlier this year than usual.
</PRE>
<PRE>
<pos=153 top=3 left=0 right=41 eol=1>By the way, I'm mailing you about the trip
<pos=196 top=4 left=0 right=12 eol=0>of next week.
</PRE>
...
```

FIG. 40

| EXTRACTION MODE | ON/OFF |
|---|---|
| EXTRACT SENDER (E-MAIL) | ON |
| EXTRACT DATE (E-MAIL) | OFF |
| EXTRACT TITLE (E-MAIL) | ON |
| EXTRACT HEADING | ON |
| EXTRACT BODY | ON |
| EXTRACT PARAGRAPH-BY-PARAGRAPH | OFF |
| EXTRACT TABLE | ON |
|    EXTRACT ROW-BY-ROW | OFF |
|    EXTRACT COLUMN-BY-COLUMN | ON |
|     ADD ITEM | ON |
| SEQUENTIALLY EXTRACT CELL ACROSS A PLURALITY OF ROWS | OFF |
| EXTRACT QUOTATION | ON |
| ⋮ | ⋮ |

FIG. 41

| UNIT |
|:---:|
| km |
| k m |
| km |
| KILOMETER |
| KILOMETER |
| KILOMETER |
| cm |
| c m |
| cm |
| CENTIMETER |
| CENTIMETER |
| CENTIMETER |
| ⋮ |

FIG. 42

| TAG | ACTION |
|---|---|
| <H> | ADD HIGHLIGHTING TAG |
| <TABLE> | INDICATE IN BLUE USING COLORING TAG |
| ⋮ | ⋮ |
| <USR_01> | NOT EXTRACT SENTENCE |
| <USR_02> | ADD SOUND-EFFECT TAG |
| <USR_03> | ADD DIFFERENT-VOICE-TYPE TAG FOR VOICE OUTPUT |
| ⋮ | ⋮ |
| UNDEFINED | NOT EXTRACT SENTENCE |

FIG. 44

This is the presentation of development items.
E-mail Quotation

>The presentation of development items will be held as follows:

>I hope that this system will be improved.

>Date: October 13, 2001

Regards,
------------------------------------------------

FIG. 46

| TEMPLATE REFERENCE MODE ITEM | MODE |
|---|---|
| FUZZY SEARCH FOR TEXT ID | ON |
|     PRECISION | 70 % |
| FUZZY ADAPTATION OF TEMPLATE | ON |
|     PRECISION | 80 % |
| TEMPLATE EDITING MODE | TREE |
| AUTO-SAVE TEMPLATE | OFF |
| TEMPLATE MISMATCH WARNING | ON |
| ⋮ | ⋮ |

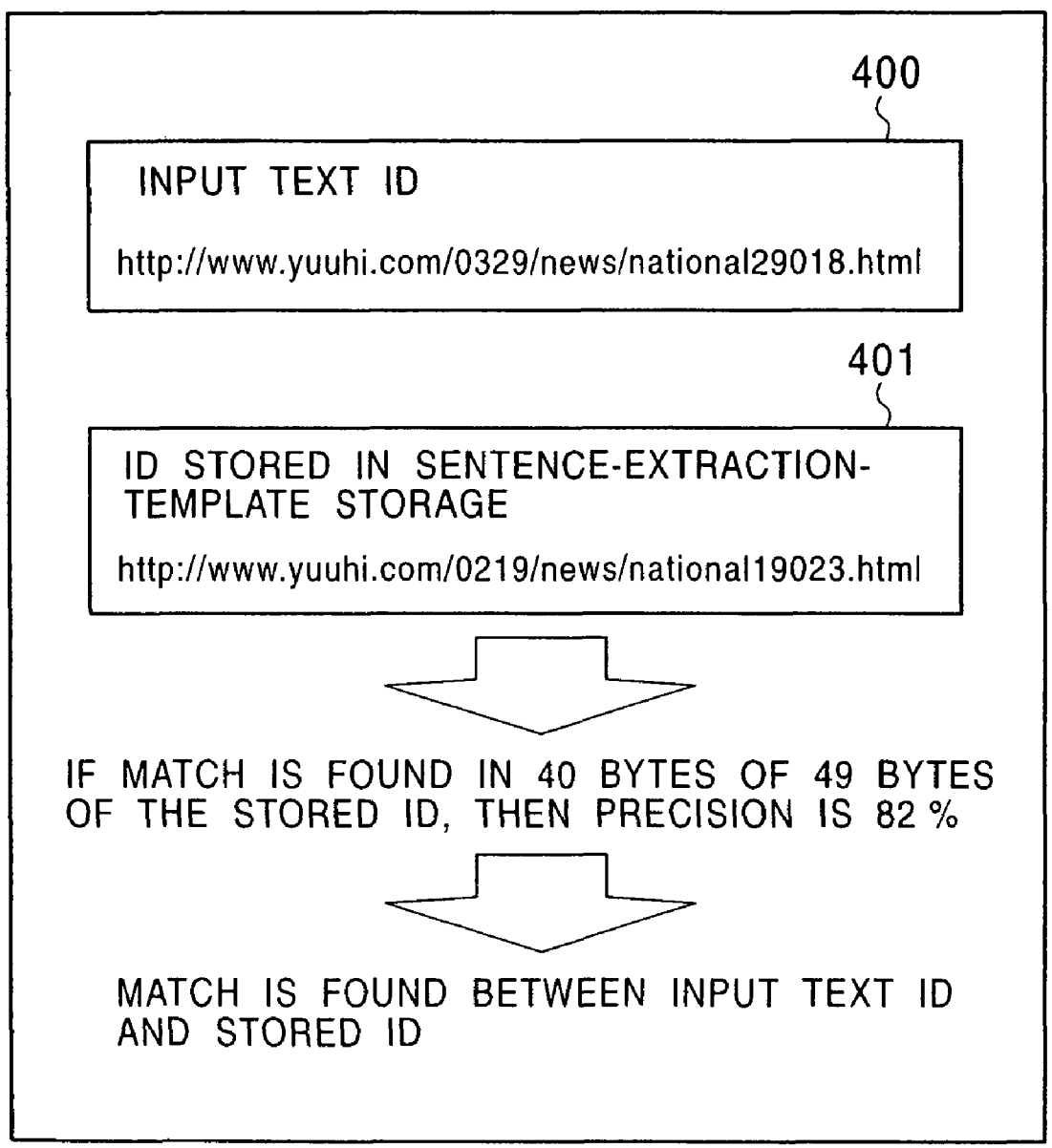

DOCUMENT PROCESSING APPARATUS, DOCUMENT PROCESSING METHOD, DOCUMENT PROCESSING PROGRAM AND RECORDING MEDIUM

BACKGROUND OF THE INVENTION

Related Applications

This application is a continuation of U.S. application Ser. No. 11/185,303, filed Jul. 20, 2005, which, is a continuation of U.S. application Ser. No. 10/143,279, filed May 10, 2002, which, in turn, claims priority under 35 U.S.C. 371 and 37 CFR 1.495 to Japanese application No. JP2001-140778, filed May 10, 2001, all of which are herein incorporated by reference in their entirety.

FIELD OF THE INVENTION

The present invention relates to a document processing apparatus, a document processing method, and a document processing program in which digitized text information is extracted in order to make it more convenient to read the text aloud, and further relates to a recording medium for use therewith.

DESCRIPTION OF THE RELATED ART

Recently, as the Internet has become increasingly widespread, a large volume of digitized text data has been handled over networks. On the Internet, in particular, voluminous digitized text data is exchanged via web sites on the World Wide Web (WWW) or by e-mail. E-mail messages mainly contain plain text information. On a web site, on the other hand, text data is mainly described in HTML (Hyper Text Markup Language).

In HTML, a document in a text-data format has codes, called tags, embedded therein, which are also expressed using text data, and the tags can be used to define the document structure. A document described in HTML is read using viewer software supporting the document in order to view the document in a layout according to the document structure defined by the tags. Hereinafter, a document described in HTML is simply referred to as an "HTML document".

The data format of text data exchanged over a network is still different between e-mails and HTML documents, thus requiring different viewers therefor.

Occasionally, it may be necessary to extract sentences in a predetermined fashion from the text data obtained in this way over a network according to the document structure. For example, in order to read aloud a document in a synthetic voice, etc., sections to be read aloud may have to be automatically extracted from the obtained text data. In order to view a document on a display, again, more conveniently, a selective extraction of desired sections is automated.

In the related art, sentences are extracted from such HTML documents merely by removing the tag information.

A typical viewer for viewing text data presents ruled lines by continuously repeating a symbol such as "*" or "–" on one line, or by using a symbol such as "|", in a text-format document, such as an e-mail message. In this way, symbols can be used to form a table in a text-format document. When sentences are extracted from such a document, generally, the symbols used as a ruled line are simply segmented as a character string, and are not identified as a table.

In text data, typically, a quotation symbol such as ">" is used for quoting the document of others. In an e-mail response, for example, this quotation symbol may be added at the beginning of each line of an original e-mail message to indicate that the original message has been quoted.

There has been a system in the related art which is configured to identify a block including quoted sections to distinctively show the quoted sections and the other sections in different colors. In this case, again, if a sentence is extracted from the quoted text, the sentence together with the quotation symbol, such as ">", is take out.

An extended e-mail system which has become popular recently is a system such as a so-called mail magazine capable of transmitting the same information to multiple destinations at once. The transmitted e-mail often contains a large amount of information, namely, blocks of advertisements, a signature, and the like, in addition to the text body. Generally, it is difficult to remove such additional information from the text data to acquire only the text body information.

Furthermore, as described above, an HTML document uses tags to define the document structure, and the document structure is viewed using an appropriate viewer in a style according to the tags. This allows a tag to be generally used as a control code indicating visual functionality for display, that is, a layout, whereas the positional functionality, such as whether a text section associated with the tag indicates a table or a heading in the document, may not be determined from the tag even in an HTML document.

In a typical apparatus for reading aloud an HTML document, therefore, sections to be read aloud and the other sections cannot be differentiated in the HTML document only by tags. In addition, an operator cannot specify which sections are to be read aloud.

SUMMARY OF THE INVENTION

Accordingly, it is an object of the present invention to provide a document processing apparatus, a document processing method, and a document processing program in which a section which is desired to be read aloud is extracted, as desired, from e-mail text data or HTML text data, and further to provide a recording medium for use therewith.

It is another object of the present invention to provide a document processing apparatus, a document processing method, and a document processing program which are capable of unitarily processing e-mails and HTML documents, and further to provide a recording medium for use therewith.

To this end, in an aspect of the present invention, a document processing apparatus for processing digitized document data includes: a block dividing unit for dividing input text data into blocks in a predetermined manner according to the structure of the text data; a document structuring unit for structuring the text data by parsing the document structure of a block into which the document data is divided by the block dividing unit according to the structure of the text data to segment the text data into sentences, and by adding tag information to the segmented sentences according to the structure of the text data; and a sentence extraction unit which controls an extraction of the sentences according to the tag information added to the sentences in the text data structured by the document structuring unit.

In another aspect of the present invention, a document processing method for processing digitized document data includes the steps of: dividing input text data into blocks in a predetermined manner according to the structure of the text data; structuring the text data by parsing the document structure of a block into which the document data is divided by the block dividing step according to the structure of the text data to segment the text data into sentences, and by adding tag information to the segmented sentences according to the structure of the text data; and extracting the sentences according to the tag information added to the sentences in the text data structured by the document structuring step.

In another aspect of the present invention, a document processing program causes a computer apparatus to execute a document processing method for processing digitized document data. The document processing program causes the computer apparatus to execute the steps of: dividing input text data into blocks in a predetermined manner according to the structure of the text data; structuring the text data by parsing the document structure of a block into which the document data is divided by the block dividing step according to the structure of the text data to segment the text data into sentences, and by adding tag information to the segmented sentences according to the structure of the text data; and extracting the sentences according to the tag information added to the sentences in the text data structured by the document structuring step.

In another aspect of the present invention, a recording medium records a document processing program for causing a computer apparatus to execute a document processing method for processing digitized document data, the document processing method including the steps of: dividing input text data into blocks in a predetermined manner according to the structure of the text data; structuring the text data by parsing the document structure of a block into which the document data is divided by the block dividing step according to the structure of the text data to segment the text data into sentences, and by adding tag information to the segmented sentences according to the structure of the text data; and extracting the sentences according to the tag information added to the sentences in the text data structured by the document structuring step.

According to the present invention, therefore, input text data is divided into blocks in a predetermined manner according to the structure of the text data, the text data is structured by parsing the document structure of a divided block according to the structure of the text data to segment the text data into sentences, and by adding tag information to the segmented sentences according to the structure of the text data, and the sentences are extracted according to the tag information added to the sentences in the sentence-structured data. This makes it possible to easily extract sentences from input text data.

BRIEF DESCRIPTION OF THE DRAWINGS

FIGS. 7A and 7B are views schematically showing an example of tagging for ruled-line characters;

FIG. 8 is a table of ruled-line characters registered in a ruled-line-character register;

FIGS. 9A and 9B are views schematically showing an example of tagging for character-based ruled lines;

FIG. 10 is a table of characters registered in a continuous-character-based ruled-line character register;

FIGS. 11A and 11B are views schematically showing an example of tagging for a horizontal rule formed by horizontal-rule characters;

FIG. 12 is a table of horizontal-rule characters registered in a horizontal-rule character register;

FIGS. 13A and 13B are views schematically showing an example of tagging for blank lines with block tag;

FIGS. 14A and 14B are views schematically showing an example of tagging for a two-dimensional regular expression;

FIG. 15 is a table of regular expressions registered in a regular-expression register;

FIGS. 16A and 16B are views schematically showing how an unwanted tag is deleted from tagged text;

FIG. 17 is a table showing a list of used tags which are registered in a used-tag register;

FIGS. 18A and 18B are views schematically showing an example of tagging for the character position on each line;

FIGS. 20A and 20B are views schematically showing how a character string emphasized by underline characters is tagged with an underline tag indicating underline emphasis;

FIGS. 22A and 22B are views schematically showing an example of tagging for a character string which uses a quotation character indicating a quotation from a different document;

FIGS. 24A and 24B are views schematically showing an example of tagging for a quotation character;

FIGS. 25A and 25B are views schematically showing an example of tagging for a heading line;

FIGS. 27A and 27B are views schematically showing that a centered character string is identified as a heading;

FIGS. 28A and 28B are views schematically showing that a character string is identified as a heading based on the character position;

FIGS. 29A and 29B are views schematically showing that a bracketed character string is identified as a heading;

FIG. 31 is a view showing a table formed by ruled-line characters;

FIG. 32 is a view showing that a table is segmented into cells which are then tagged with tags indicating a table;

FIGS. 33A and 33B are views schematically showing regular expressions in block-structured data;

FIGS. 34A and 34B are views schematically showing a block break using a blank line;

FIGS. 35A and 35B are views schematically showing how matching of quotation marks is checked by a quotation-mark determining unit;

FIGS. 36A and 36B are views schematically showing that a block is divided based on a paragraph break;

FIGS. 37A and 37B are views schematically showing that a block is segmented into sentences based on the period;

FIG. 40 is a table of example extraction modes;

FIG. 41 is a table of units;

FIG. 42 is a table of tag action data;

FIG. 44 is a view showing that flag information for a node in a template is pointed;

FIG. 46 is a table of template search modes; and

FIG. 47 is a view schematically showing an example fuzzy search based on a text ID.

DESCRIPTION OF THE PREFERRED EMBODIMENTS

Some embodiments of the present invention are now described with reference to the drawings.

Figure 1:
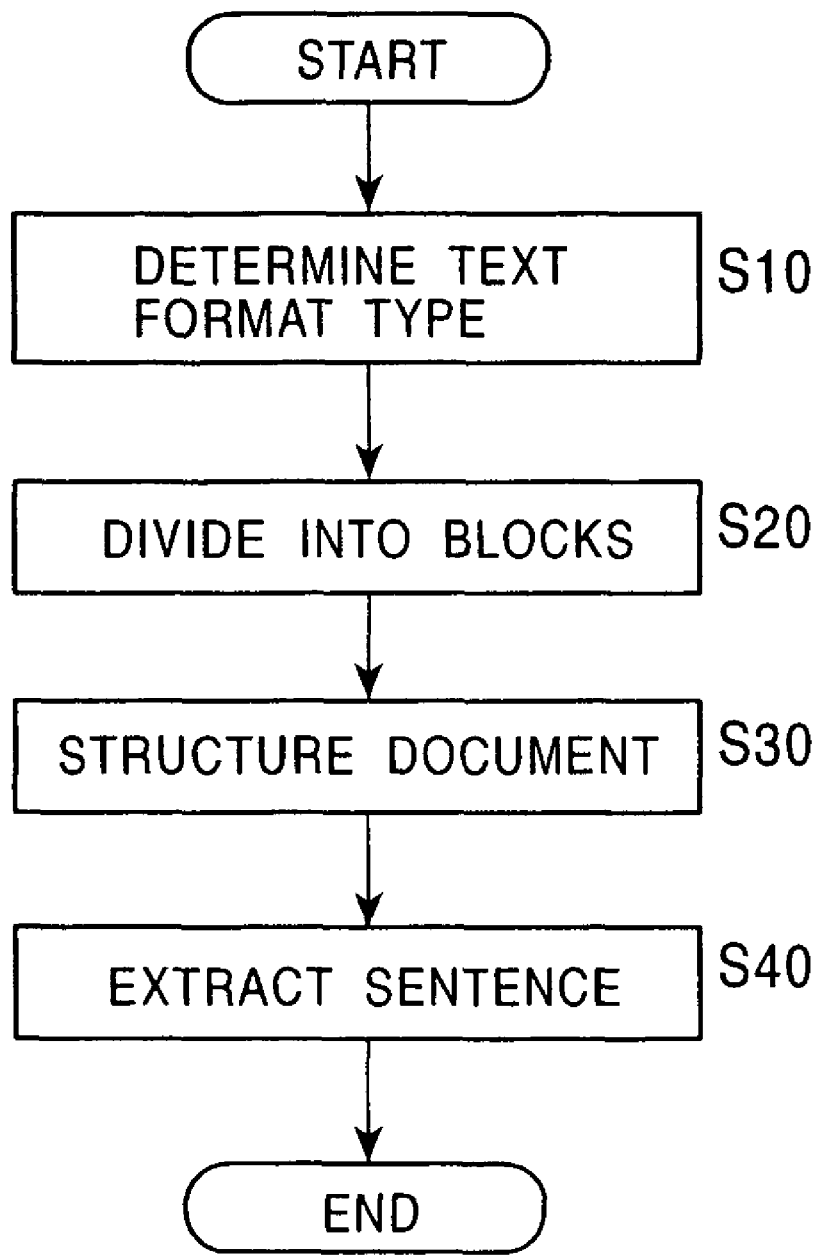
FIG. 1 is a flowchart showing an outline of a document processing sequence according to the present invention.

FIG. 1 is a flowchart showing an outline of a document processing sequence according to the present invention.

In step S10, the data type of character information on an incoming e-mail message or HTML document is determined to determine the type of text format. The text format is then converted into a format which can be processed by an apparatus for document processing. The document is divided into blocks in step S20, followed by step S30 in which a quotation, a heading, a table, a paragraph, etc. are extracted to structure the document. In step S40, a sentence is extracted, as desired, from the structured document.

The extracted sentence is input to, for example, an apparatus for reading aloud text in a synthetic voice, and is thus output as audio information. An action allocated to an element of the extracted sentences can also be taken. Of course, the separated sentence can simply be displayed on a display device. A template which is prepared beforehand may be used for a more efficient separation of sentences.

Figure 2:
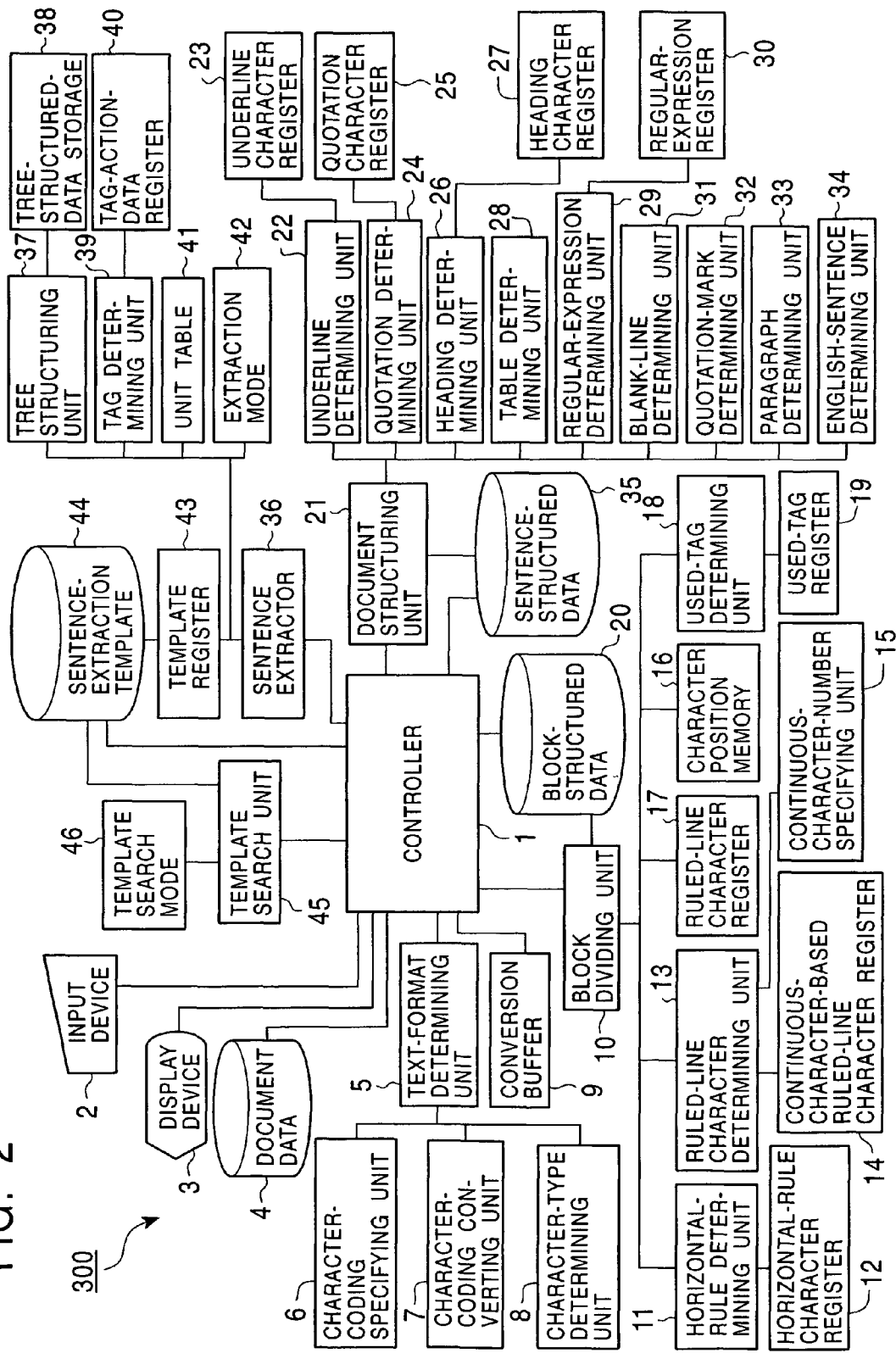
FIG. 2 is a functional block diagram for implementing the functionality of a document processing apparatus according to an embodiment of the present invention.

FIG. 2 is a functional block diagram for implementing the functionality of a document processing apparatus 300 according to an embodiment of the present invention. A controller 1 which controls the overall document processing apparatus 300 comprises a CPU (central processing unit), and serves to manage the overall software and hardware.

Incoming text data which is input from an input device 2 connected to the controller 1 is stored in a document data storage 4. The document data storage 4 takes up a predetermined area of a storage medium such as a hard disk drive (HDD). A display device 3 connected to the controller 1 displays the text data input by the input device 2 or sentences which are finally extracted by the document processing apparatus 300.

The input device 2 may be a keyboard or a voice input device for converting voice-input text information into text data which is then output. As an alternative, the input device 2 may be a communication interface connected to an external network such as the Internet, through which text data may be acquired from an external network. Alternatively, a predetermined connector may be used as an input device to connect to another compatible device, through which text data may be acquired from an external device. Of course, text data may be acquired from a removable storage medium such as a flexible disk (FD), a magneto-optical disk (MO), or a CD-ROM (compact disc read-only memory).

A text-format determining unit 5 executes the process in step S10 in the flowchart of FIG. 1. The text-format determining unit 5 includes a character-coding specifying unit 6, a character-coding converting unit 7, and a character-type determining unit 8, and serves to determine and convert the data format of text in the input text data. The character-type determining unit 8 determines the encoding method of the input text data. The character-coding specifying unit 6 specifies the character coding, such as EUC (extended Unix code) or SJIS (shift-JIS) coding, to be processed by the document processing apparatus 300. The character-coding converting unit 7 converts the character coding of the input text data into a character coding which can be processed by the document processing apparatus 300.

The text data which is processed in this way by the text-format determining unit 5 is buffered in a RAM (random access memory) 111, as described below, which is implemented as a conversion buffer 9. The text data buffered in the conversion buffer 9 is passed to a block dividing unit 10 by the controller 1.

The block dividing unit 10 executes the process in step S20 in the flowchart of FIG. 1 on the text data passed from the conversion buffer 9. The block dividing unit 10 includes a horizontal-rule determining unit 11, a horizontal-rule character register 12, a ruled-line character determining unit 13, a continuous-character-based ruled-line character register 14, a continuous-character-number specifying unit 15, a ruled-line character register 17, a character position memory 16, a used-tag determining unit 18, and a used-tag register 19.

In the horizontal-rule determining unit 11, a horizontal rule contained in the text data is extracted based on the information registered in the horizontal-rule character register 12, and is tagged with a predetermined tag. In the ruled-line character determining unit 13, a ruled line contained in the text data is extracted based on the information registered in the continuous-character-based ruled-line character register 14 and the ruled-line character register 17, and based on the information specified by the continuous-character-number specifying unit 15, and is tagged with a predetermined tag. In the character position memory 16, a tag indicating the position information of each line in the original text data is added to each line of the input text data. In the used-tag determining unit 18, a non-use tag contained in the text data is extracted based on the information registered in the used-tag register 19, and is deleted.

The text data is thus divided into blocks to generate block-structured data through the above-described process, and is then stored in a block-structured-data storage 20 that takes up a predetermined area of a storage medium such as an HDD.

A document structuring unit 21 executes the process in step S30 in the flowchart of FIG. 1. The document structuring unit 21 includes an underline determining unit 22, an underline character register 23, a quotation determining unit 24, a quotation character register 25, a heading determining unit 26, a heading character register 27, a table determining unit 28, a regular-expression determining unit 29, a regular-expression register 30, a blank-line determining unit 31, a quotation-mark determining unit 32, a paragraph determining unit 33, and an English-sentence determining unit 34.

In the underline determining unit 22, an underline contained in the text data is extracted based on the information registered in the underline character register 23, and is tagged with a predetermined tag. In the quotation determining unit 24, a quoted section contained in the text data is extracted based on the information registered in the quotation character register 25, and is tagged with a predetermined tag. In the heading determining unit 26, a heading section contained in the text data is extracted based on the information registered in the heading character register 27, and is tagged with a predetermined tag. The table determining unit 28 extracts a table section contained in the text data and parses the table structure, which is then tagged with a predetermined tag. In the regular-expression determining unit 29, a section to be extractable using a regular expression which is contained in the text data is detected based on the information registered in the regular-expression register 30, and is tagged with a predetermined tag. In the blank-line determining unit 31, a blank section contained in the text data is extracted, and is tagged with a predetermined tag. The quotation-mark determining unit 32 checks for quotation marks contained in the text data, which are then tagged with predetermined tags, while correcting a paragraph break determined by the paragraph determining unit 33, as described below, depending upon the position of the quotation marks. In the paragraph determining unit 33, a paragraph break in the document information is detected, and is tagged with a predetermined tag. The English-sentence determining unit 34 extracts an English sentence contained in the document, which is then tagged with a predetermined tag, and hyphenates the English sentence.

The text data is thus tagged with a predetermined tag for each element through the above-described process, and is structured to generate sentence-structured data. Then, the text data is stored in a sentence-structured-data storage 35 that takes up a predetermined area of a storage medium such as an HDD.

A sentence extractor 36 executes the process in step S40 in the flowchart of FIG. 1. The sentence extractor 36 includes a tree structuring unit 37, a tree-structured-data storage 38, a tag determining unit 39, a tag-action-data register 40, a unit table 41, and an extraction mode 42.

In the tree structuring unit 37, the tagged text data stored in the sentence-structured-data storage 35 is converted into tree-structured data, and is then stored in the tree-structured-data storage 38. In the tag determining unit 39, an action which is registered in the tag-action-data register 40 and which is allocated to each tag is taken with respect to a tag added to the text data stored in the sentence-structured-data storage 35. The unit table 41 is referred to, for example, when sentences in a table are extracted together with units specified in that. When a sentence is extracted from the text data stored in the sentence-structured-data storage 35, the extraction mode 42 is used to specify a sentence to be extracted based on the tags added to the sentence.

According to an embodiment of the present invention, a template stored in a sentence-extraction-template storage 44 may be used when a sentence is extracted from the structured text data. The template is registered in a predetermined manner in a template register 43, and is stored in the sentence-extraction-template storage 44. The sentence-extraction-template storage 44 takes up a predetermined area of a storage medium such as an HDD. Based on the information specified by a template search mode 46, a template search unit 45 searches the stored segmentation templates for an appropriate template.

Figure 3:
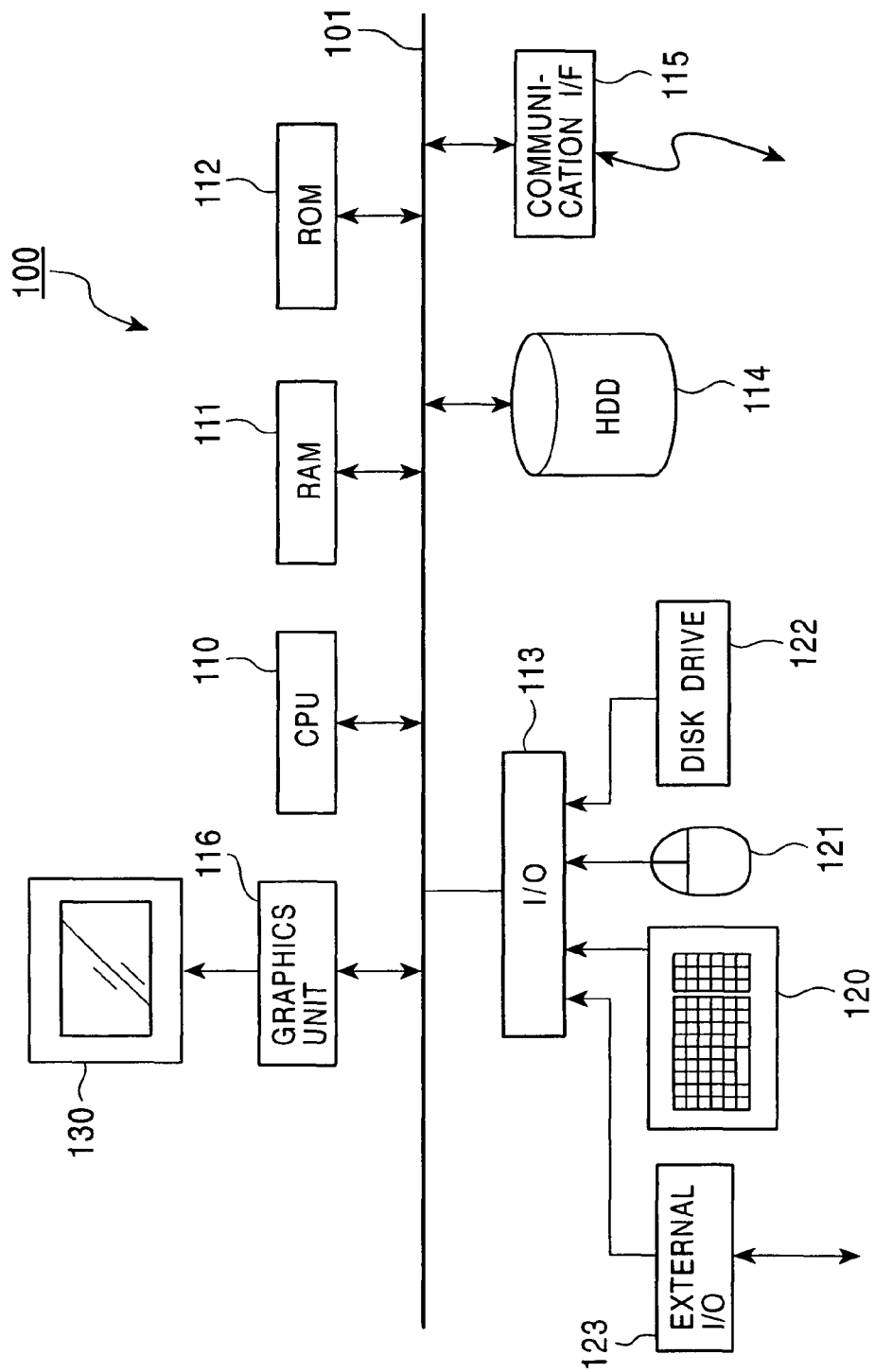
FIG. 3 is a block diagram of a computer apparatus incorporating the document processing apparatus according to the embodiment.

FIG. 3 shows the structure of a computer apparatus 100 incorporating the document processing apparatus 300. As shown in FIG. 3, the document processing apparatus 300 can be implemented on the general-purpose computer apparatus 100. A CPU 110, a RAM (random access memory) 111, a ROM (read-only memory) 112, and a graphics unit 116 are connected to a bus 101. The CPU 110 uses the RAM 111 as a working memory, and controls the overall computer apparatus 100 according to a predetermined program. The RAM 111 is also used as the conversion buffer 9, as described above.

The ROM 112 stores, in advance, a program and data by which the computer apparatus 100 is launched.

In the CPU 110, a predetermined display control signal is generated according to the instruction of the program, and is supplied to the graphics unit 116 via the bus 101. The graphics unit 116 generates a display signal which is displayable on a display 130 in response to the supplied display control signal. The display signal is supplied from the graphics unit 116 to the display 130, such as a CRT (cathode-ray tube) or an LCD (liquid crystal display), for display in a predetermined manner.

An input/output (I/O) unit 113, a hard disk drive (HDD) 114, and a communication interface (I/F) 115 are also connected to the bus 101.

The I/O unit 113 controls data exchange between the computer apparatus 100 and an external device. For example, a keyboard 120 and a mouse 121 are connected to the I/O unit 113. Character information input from the keyboard 120, and moving information and button information of the mouse 121 are supplied to the I/O unit 113, and are further supplied to, for example, the CPU 110 via the bus 101.

A disk drive 122 may also be connected to the I/O unit 113. The disk drive 122 may be a CD-ROM drive capable of playing back a CD-ROM (compact disc ROM), and serves to input text data recorded in the CD-ROM to the computer apparatus 100. The disk drive 122 need not be a CD-ROM drive, and may be a flexible disk drive or an MO (magneto-optical disk) drive.

An external input/output (I/O) 123 may have a predetermined type of connector, and is connected to another device having a connector of the type compatible therewith via a cable so that data may be communicated therebetween. The text data prepared by an external device may be input to the computer apparatus 100 through the external I/O 123. For example, a sentence which is finally extracted from text data by the computer apparatus 100 may be output to an external device through the external I/O 123. The external I/O 123 is not necessarily connected via a cable, and may be an interface capable of communication using infrared signals.

The HDD 114 has areas for, for example, the document data storage 4, the block-structured-data storage 20, the sentence-structured-data storage 35, and the sentence-extraction-template storage 44, as described above, and the respective data are stored in the areas. The data or tables registered by the registers shown in FIG. 2 are stored in the HDD 114. The HDD 114 may be used as the conversion buffer 9. The HDD 114 also contains an OS (operating system) program for a basic control system of the computer apparatus 100, and programs and data for implementing the document processing apparatus 300 in the computer apparatus 100.

The communication I/F 115 is connected between the computer apparatus 100 and an external network such as the Internet, and controls communication to/from the external network according to the instruction of the CPU 110. The text data prepared by another device connected to the network may be input to the computer apparatus 100 through the communication I/F 115. Of course, a sentence which is finally extracted from text data by the computer apparatus 100 may be output to an external device through the communication I/F 115. As an alternative, program data for constructing the document processing apparatus 300 according to the present embodiment on the computer apparatus 100 may be acquired from a network through the communication I/F 115.

Although not shown in FIG. 3, the computer apparatus 100 may further include a voice synthesizer and a voice output device. The voice synthesizer generates a synthetic voice according to the supplied text data. The synthetic voice is audibly output by the voice output device. This enables a sentence which is processed and extracted by the document processing apparatus 300 constructed on the computer apparatus 100 to be audibly read aloud.

In the computer apparatus 100, first required is an installation of a program for constructing the document processing apparatus 300. For example, a CD-ROM having a program recorded thereon is placed onto the disk drive 122 for playback. The program data read from the CD-ROM is loaded in a predetermined manner and stored on, for example, the HDD 114 to complete the installation. After the installation, the program is launched on a predetermined device with respect to the computer apparatus 100 to construct the document processing apparatus 300 according to the present embodiment on the computer apparatus 100.

The program is not necessarily supplied by a recording medium such as a CD-ROM or an MO, and may be acquired, for example, from another computer apparatus connected to a network. Under control of the communication I/F 115, the program data is downloaded from the network. The downloaded program data is loaded in a predetermined manner and stored on, for example, the HDD 114 to complete the installation. As an alternative, program data may be acquired from another external device through the external I/O 123.

Now, the operation of the document processing apparatus 300 according to an embodiment of the present invention is described in more detail.

Figure 4:
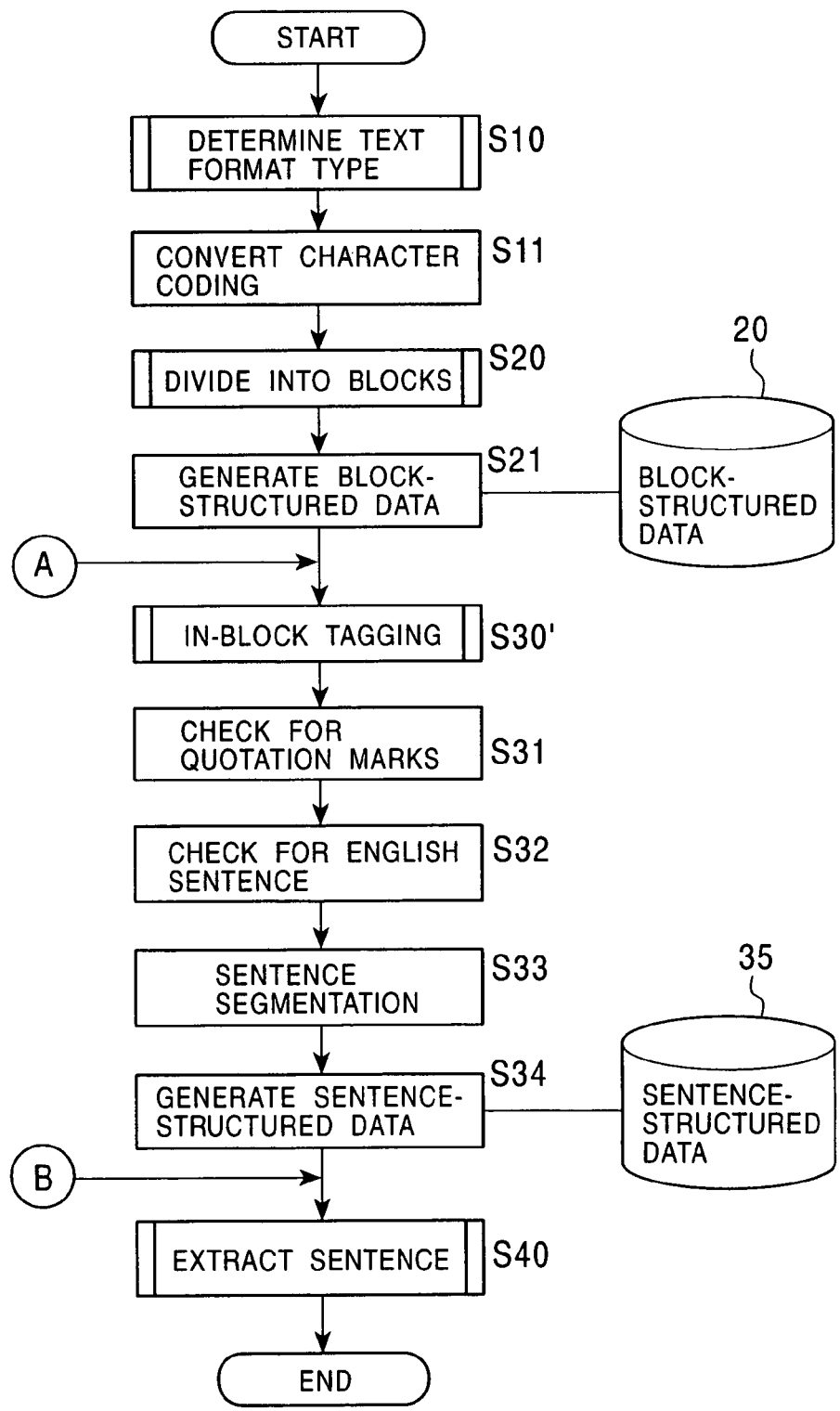
FIG. 4 is a flowchart showing a document processing sequence according to an embodiment of the present invention.

FIG. 4 is a flowchart which schematically illustrates a document processing sequence according to an embodiment of the present invention. FIG. 4 shows the flowchart of FIG. 1 in greater detail, in which the same numerals are given to the corresponding steps.

First, the type of text format of input document data is determined in step S10, followed by step S11, in which the character coding used for character information is converted into a character coding which can be internally processed by the document processing apparatus 300.

In step S20, the resulting document data, which can be internally processed, is divided into blocks having a predetermined unit, and text data which is block-structured data is generated in step S21. The generated text data is stored in the block-structured-data storage 20.

In step S30', the block-structured data is tagged in each block to structure the text data. Step S30' is illustrated in the document structuring step S30 in FIG. 1. The tagging in each block in step S30' is followed by step S31 in which quotation-marks are checked, step S32 in which an English sentence is checked, and step S33 in which the data is segmented into sentences, thereby generating structured text data (step S34). The resulting structured text data (sentence-structured data) is stored in the sentence-structured-data storage 35.

Finally, in step S40, the sentences are extracted from the text data stored in the sentence-structured-data storage 35.

Figure 5:
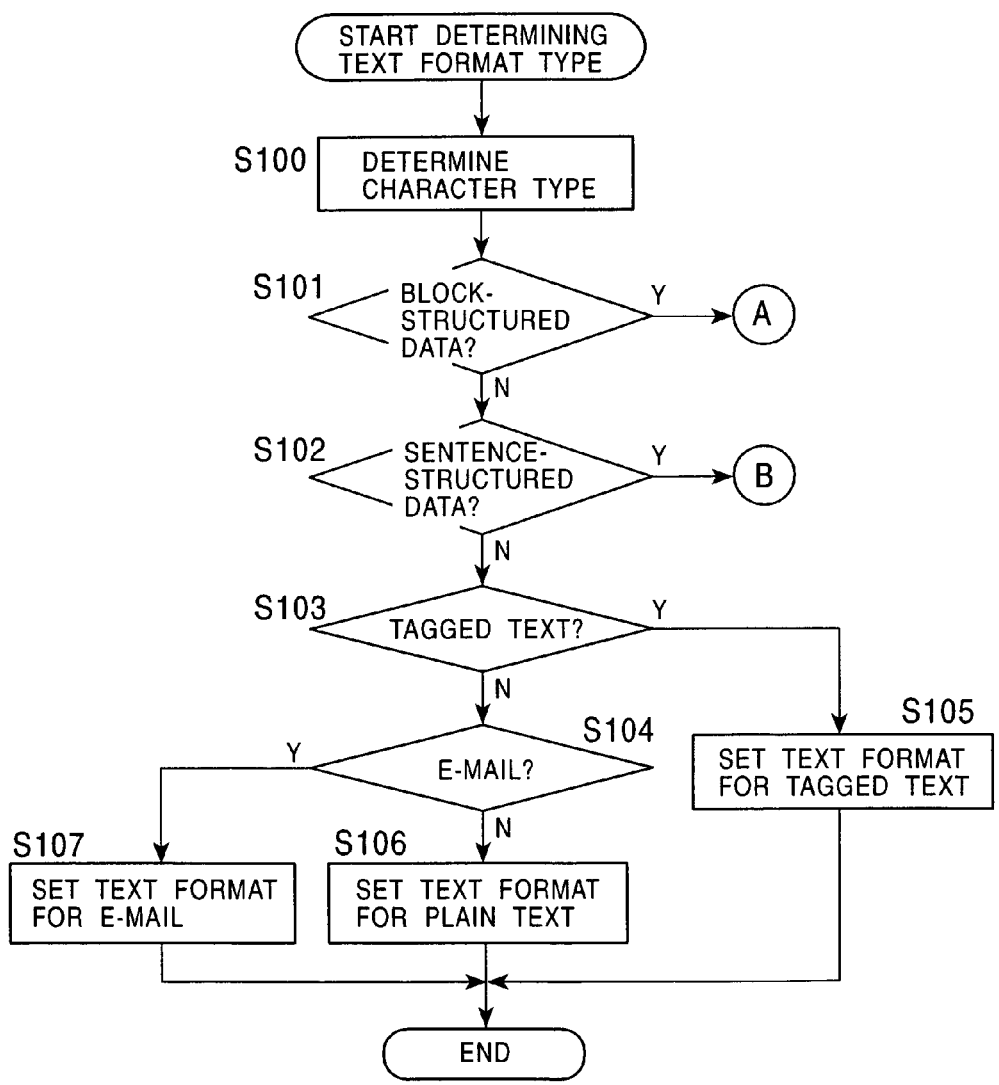
FIG. 5 is a flowchart which illustrates a process for determining a text format type in greater detail.

FIG. 5 is a flowchart which illustrates a process for determining a text format type in step S10 in greater detail, and this process is performed by the text-format determining unit 5. In FIG. 5, symbols A and B correspond to the same symbols in FIG. 4, respectively.

Before an explanation of the flowchart of FIG. 5, an outline of tags is given. In general, a pair of tags, each having a pair of brackets, which indicates the start and end of a section, respectively, is embedded into text to specify any range of section. For example, a tag indicating the start of a section (referred to as a "starting tag") has a predefined character string bracketed with "<" and ">", and a tag indicating the end of the section (referred to as a "closing tag") has the same character string bracketed with "</" and ">". The character string bracketed with "<" and ">" (or "</" and ">") has a specific meaning to the section enclosed by a pair of tags. A tag may also contain a predetermined parameter. Depending upon a meaning defined for a tag, the tag may consist of a starting tag only.

In FIG. 5, in step S100, the character type of input text data is determined. The encoding method of the input text data is first checked by the character-type determining unit 8. For example, it is determined whether or not the input character information is encoded version of standard text data using an encoding technique such as Base64 or uuencode. An encoded text data would be decoded using the corresponding technique.

The text-format determining unit 5 further determines whether or not the character coding of the input text data is identical to the character coding specified by the character-coding specifying unit 6. If the character coding of the text data decoded by the character-type determining unit 8 is different from the character coding specified by the character-coding specifying unit 6, the text data is passed to the character-coding converting unit 7 to convert the text data into data in the specified coding system.

If a processed character coding is not specified by the character-coding specifying unit 6, the text data is processed according the original coding system of the text data.

Subsequently, the text is classified using tags in steps S101, S102, and S103. The text-format determining unit 5 determines, for example, whether or not a tag bracketed with "< >" is placed at the beginning of the converted text data. If a tag is placed, the type of that tag is determined. If the tag indicates an HTML format, it is determined that the text data is in an HTML format. If the tag indicates an XML (Extensible Markup Language) format, it is determined that the text data is in an XML format.

If the tag is a tag unique to the document processing apparatus 300 indicating block-structured data, it is determined that the text data is in a block-structured data format. If the tag is a tag indicating sentence-structured data, it is determined that the text data is in a sentence-structured data format. The types of tags are described below.

If the text-format determining unit 5 determines that the text data does not use a tag, it is determined whether or not symbol ":" is inserted on each line. If one or more symbols ":" are inserted, a section before the first symbol ":" on each line is interpreted as a heading. If the heading contains "DATE", "FROM", and "TO", the text data is interpreted as an e-mail message.

Accordingly, it is determined in step S101 whether or not the text data is block-structured data. If it is determined that the text data is block-structured data which has been subject to the block structuring process defined in the document processing apparatus 300, the process follows a sequence indicated by "A" in FIG. 5, and proceeds to step S30', bypassing a process for dividing data into blocks in step S20 in the flowchart of FIG. 4.

On the other hand, if it is determined in step S101 that the text data is not block-structured data, the process proceeds to step S102. In step S102, it is determined whether or not the text data is sentence-structured data. If it is determined that the text data is sentence-structured data which has been subject to the sentence structuring process defined in the document processing apparatus 300, the process follows a sequence indicated by "B" in FIG. 5, and proceeds to step S40, bypassing a process for tagging in a block in step S30' through a process for generating sentence-structured data in step S34 in the flowchart of FIG. 4.

If it is determined in step S102 that the text data is not sentence-structured data, the process proceeds to step S103. In step S103, it is determined whether the text data is tagged text in which a tag indicating an HTML or XML format is embedded. If it is determined that the text data is tagged text, the process proceeds to step S105, in which the text format of the text data is set for "tagged text".

If it is determined in step S103 that the text data is not tagged text, the process proceeds to step S104. In step S104, it is determined whether or not the text data was sent by e-mail. If it is determined that the text data was sent by e-mail, the process proceeds to step S107, in which the text format of the text data is set for "e-mail format". The text data in an e-mail format is essentially plain text.

If it is determined in step S104 that the text data was not sent by e-mail, the process proceeds to step S106, in which the text format of the text data is set for "plain text format".

The text data whose text format type has been determined in the flowchart of FIG. 5 is converted in terms of the character coding, etc., if necessary, and is then stored in the conversion buffer 9.

A process for dividing data into blocks in step S20 in the flowchart of FIG. 4 is now described in greater detail.

Figure 6:
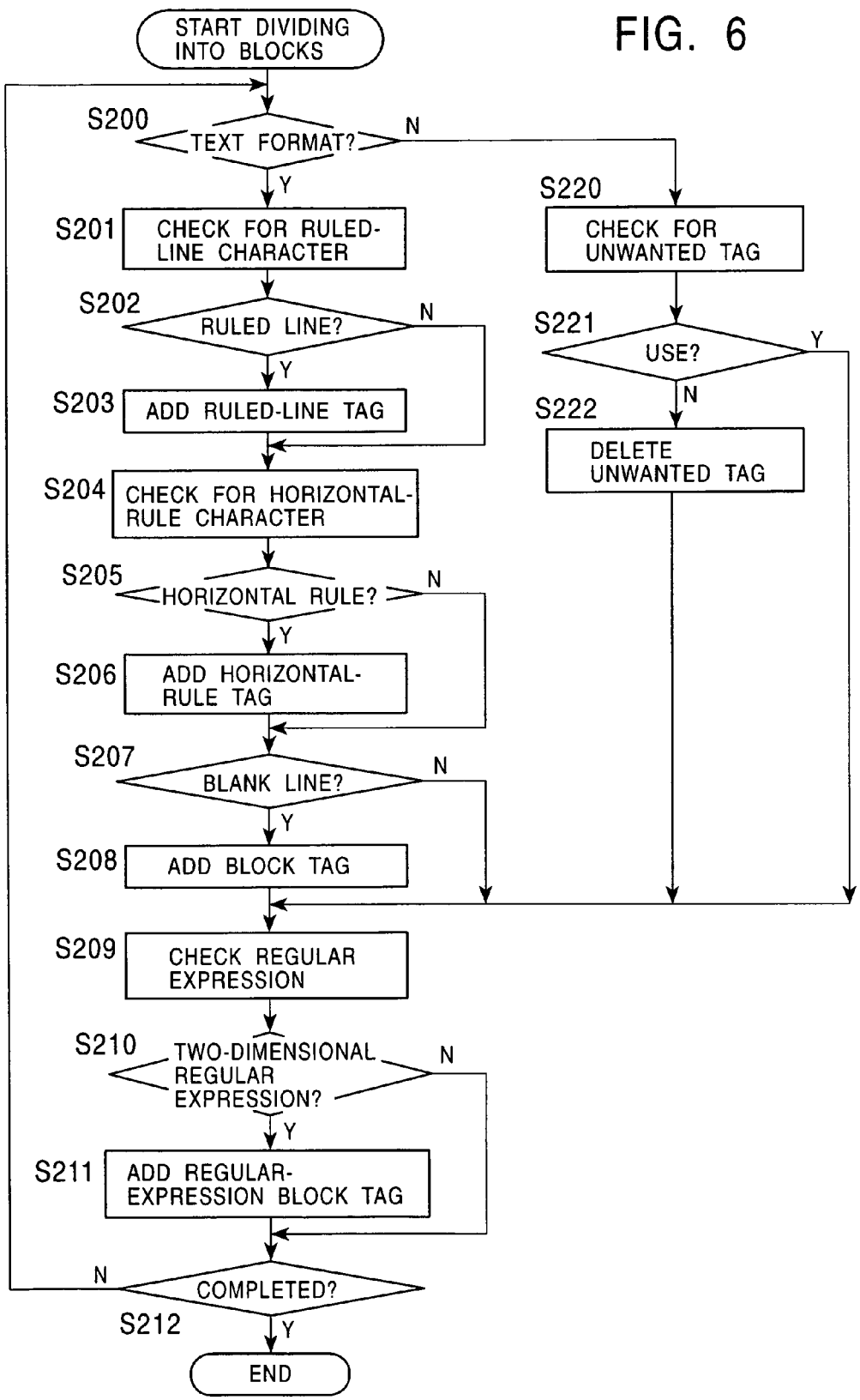
FIG. 6 is a flowchart which illustrates a process for dividing data into blocks in greater detail.

FIG. 6 is a flowchart which illustrates a process for dividing data into blocks in step S20 in greater detail, and this process is performed by the block dividing unit 10. If the text data input from the conversion buffer 9 is in an untagged text format such as an e-mail format or a plain text format, the block dividing unit 10 divides the text data into blocks in a simple manner such that elements in the blocks can be checked based on the character type.

In step S200, it is determined by the block dividing unit 10 whether or not the text data which has been subject to the process in the flowchart of FIG. 5 and which is stored in the conversion buffer 9 is in a plain text format.

If it is determined that the text data is in a plain text format, the process proceeds to step S201. In step S201, a ruled-line character contained in the text data is checked by the ruled-line character determining unit 13. Then, it is determined in step S202 whether or not the checked ruled-line character forms a ruled line. If the ruled-line character forms a ruled line, then, in step S203, it is tagged with a ruled-line tag that is defined as indicating a ruled line.

FIGS. 7A and 7B schematically show tagging for ruled-line characters. As shown in FIG. 7A, when the document contains a ruled line, first, it is determined whether or not the ruled line is formed by ruled-line characters. A ruled-line character is a character, such as a single-byte English character or a two-byte Japanese character, capable of forming a part of a ruled line.

Figure 8:
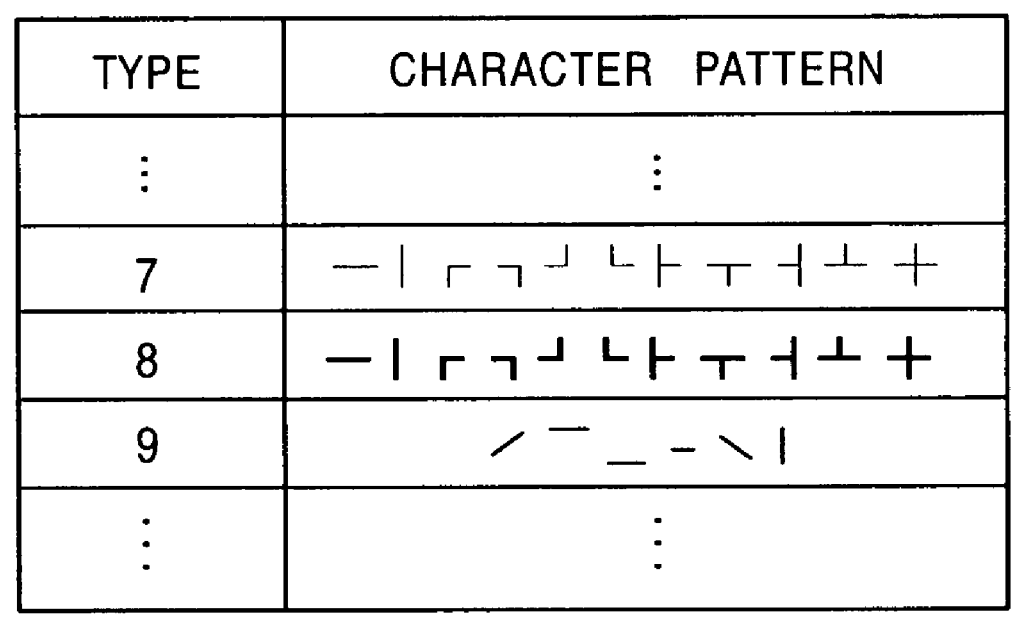

Ruled-line characters are registered in the ruled-line character register 17. FIG. 8 shows the ruled-line characters registered in the ruled-line character register 17. The ruled-line characters are classified into a plurality of patterns, and are registered in the ruled-line character register 17. In this example, three types of character patterns, namely, Type=7, Type=8, and Type=9, are registered. Matching information with the registered ruled-line characters is also registered in the ruled-line character register 17. The matching information includes information on ruled-line characters which can be combined in each type of ruled-line character pattern when the ruled-lined characters continuously appear in a row or column.

Some of the ruled-line characters and the matching information may be registered in advance as default data. Any addition or modification may be made to or on the registered ruled-line characters and matching information by a user from the ruled-line character register 17.

By referring to the registered ruled-line characters, it is determined which type of character pattern the ruled-line character contained in the text data belongs to. Furthermore, ruled-line characters are checked line-by-line, and it is determined whether or not the same type of ruled-line character appears in a continuous manner. If more than a predetermined number of ruled-line characters continuously appear, then matching between the ruled-line characters is checked. If match is found therebetween, a section in which the ruled-line characters continuously appear is identified as one block. In this case, for example, a ruled-line character that will be at the end of the line may also be determined based on the ruled-line character matching information.

In FIG. 7A, in a row containing "|WEIGHT|LENGTH|PRICE|" and a row containing "|10|20|30|", ruled-line characters and non-ruled-line characters are mixed. Based on a relationship (position relationship or matching) between ruled-line characters in the rows thereabove and therebelow, for example, it can be determined whether or not these rows are in a ruled-line-character block. The continuous number of ruled-line characters can be specified by the continuous-character-number specifying unit 15. For example, the continuous number of ruled-line characters may be registered in advance in the continuous-character-number specifying unit 15, and the continuous number of ruled-line characters may also be specified by a user.

Once a block has been specified based on the ruled-line characters in this way, a tag indicating a rule-line-based block structure (hereinafter referred to as a "ruled-line tag") is added to the head and tail, that is, the start and end positions, of that block. FIG. 7B shows that the document shown in FIG. 7A is tagged with ruled-line tags. A starting tag <TC_TSF_BLOCK> and a closing tag </TC_TSF_BLOCK> indicate a block structure according to an embodiment of the present invention. The pair of tags <TC_TSF_BLOCK> and </TC_TSF_BLOCK> uses parameter "type" to indicate the type of the block, and parameter "type=0" indicates a plain-text block.

In the example shown in FIG. 7B, the starting tag <TC_TSF_BLOCK> uses parameter "type=7" to indicate that a section enclosed by the pair of tags is block-structured data based on the ruled-line characters of Type=7.

In this case, a block is specified not only based on the above-described ruled-line characters but also based on ruled lines formed by predetermined characters.

FIGS. 9A and 9B shows tagging for character-based ruled lines. In a plain-text document, it is common to use normal characters to form a ruled line. Characters used for a ruled line may include "+", "−", "*", and "=", each of which may be repeated a plurality of times to form a ruled line. Any combination of the characters may be used to form a ruled line. Character "|" may also be used for a vertical ruled-line. In the example shown in FIG. 9A, characters "+−", "−", "−+" and "|" are used to express ruled liens, thus forming a table.

Hereinafter, a ruled line formed by such normal characters is referred to as a "character-based ruled line", and a character which can form a character-based ruled line is referred to as a "character-based ruled-line character".

A character-based ruled line is determined by referring to character-based ruled-line characters registered in the continuous-character-based ruled-line character register 14. FIG. 10 shows characters registered in the continuous-character-based ruled-line character register 14. As shown in FIG. 10, a character-based ruled-line character and what minimum number of continuous character-based ruled-line characters is used to identify a ruled line are registered in a one-to-one relation. For example, character "–" which continuously appears more than twice forms a character-based ruled line.

Such a character-based ruled line may be registered in the continuous-character-based ruled-line character register 14. The character-based ruled-line characters and the minimum numbers may be registered in advance. Any addition, modification, or deletion may be made to, on, or from the registered information by a user in the continuous-character-based ruled-line character register 14.

Once a block has been specified based on the character-based ruled-line characters in this way, a ruled-line tag is added to the head and tail, that is, the start and end positions, of that block. FIG. 9B shows that the document shown in FIG. 9A is tagged with ruled-line tags. Tags <TC_TSF_BLOCK> and </TC_TSF_BLOCK> indicating a block use parameter "type=10" to indicate that a section enclosed by the pair of tags is block-structured data based on the character-based ruled-line characters of Type=10.

Turning back to FIG. 6, after the process in steps S201 to S203, the process proceeds to steps S204. In step S204, a horizontal-rule character contained in the text data is checked by the horizontal-rule determining unit 11. In step S205, it is determined whether or not the checked horizontal-rule character forms a horizontal rule. If the horizontal-rule character forms a horizontal rule, then, in step S206, it is tagged with a horizontal-rule tag defined as indicating a horizontal rule.

FIGS. 11A and 11B show tagging for a horizontal rule formed by horizontal-rule characters. In a plain-text document, it is common to use normal characters to form a horizontal rule. Characters used for a horizontal rule may include "–", and "*", which may be repeated a plurality of times to form a horizontal rule. Any combination of the characters may be used to form a horizontal rule, and a combination thereof.

Figure 12:
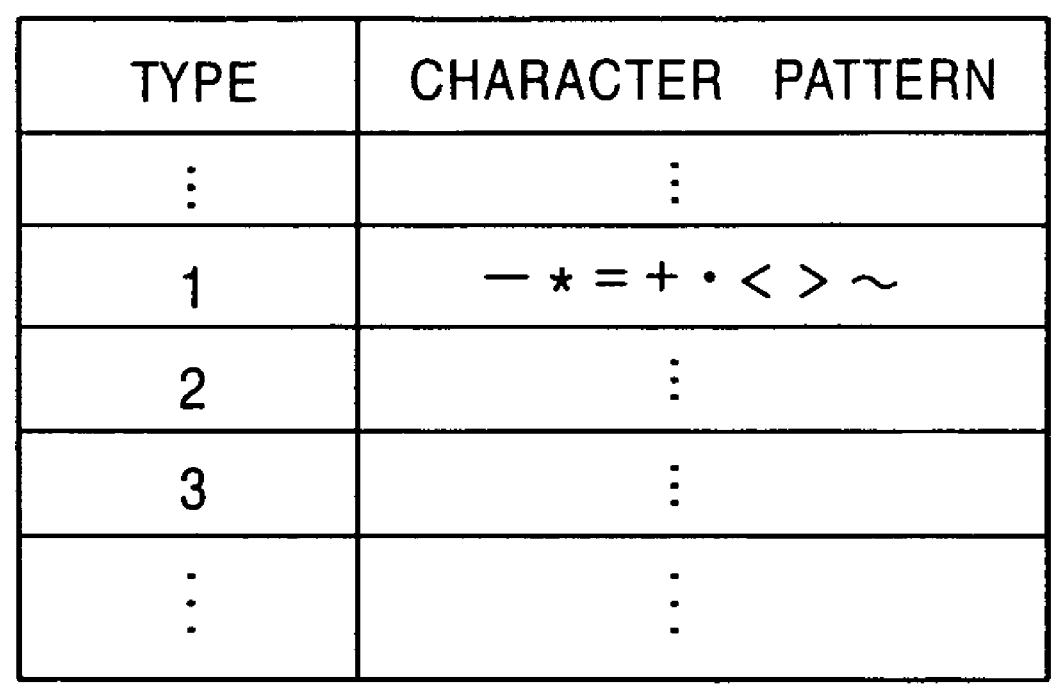

A horizontal rule is determined by referring to horizontal-rule characters registered in the horizontal-rule character register 12. FIG. 12 shows horizontal-rule characters registered in the horizontal-rule character register 12. When a horizontal-rule character is continuously repeated on one line, and terminates on that line, it is determined that the horizontal-rule character forms a horizontal rule. The horizontal-rule characters may be registered in advance. Any addition, modification, or deletion may be made to, on, or from the registered information by a user in the horizontal-rule character register 12.

Once a block has been specified based on the horizontal-rule characters in this way, a horizontal-rule tag is added to the lines above and below the horizontal rule. FIG. 11B shows that the document shown in FIG. 11A is tagged with horizontal-rule tags. Tags <TC_TSF_BLOCK> and </TC_TSF_BLOCK> indicating a block use parameter "type=1" to indicate that a section enclosed by the pair of tags is block-structured data based on the horizontal-rule character of Type=1.

Returning to FIG. 6, after the process in steps S204 to S206, the process proceeds to steps S207. In step S207, a blank line contained in the text data is checked by a blank-line determining unit (not shown). In step S208, a section defined between the blank lines is tagged with a block tag which identifies that section as a block.

FIGS. 13A and 13B shows tagging for blank lines with block tags. In text shown in FIG. 13A, a blank line that consists of blank or white-space characters is checked in the text line-by-line. In the example shown in FIG. 13A, the first line, the middle line, and the last line are identified as blank lines. The sections between the blank lines are determined as blocks, each block being tagged with a starting tag <TC_TSF_BLOCK> and a closing tag </TC_TSF_BLOCK>. The tags <TC_TSF_BLOCK> and </TC_TSF_BLOCK> indicating a block use parameter "type=0" to indicate that a section enclosed by the pair of tags is plain-text block-structured data of Type=0, which is defined between blank lines.

After the process in steps S207 to S208, the process proceeds to steps S209. In step S209, a portion of the text data that uses a regular expression is detected by the regular-expression determining unit 29. In the example shown in FIG. 2, the regular-expression determining unit 29 and the regular-expression register 30 are shared by the block dividing unit 10 and the document structuring unit 21. In step S210, it is determined whether or not the detected portion is a block indicated using a two-dimensional regular expression. If YES is obtained, then, in step S211, this portion is tagged with a regular-expression block tag which is defined as indicating a block indicated using a two-dimensional regular expression.

FIGS. 14A and 14B schematically show tagging for a two-dimensional regular expression. In FIG. 14A, if the document contains a section defined by a predetermined pattern, regular-expression patterns registered in the regular-expression register 30 is referred to by the regular-expression determining unit 29 to determine whether or not the pattern matches a two-dimensional regular expression.

FIG. 15 shows regular expressions registered in the regular-expression register 30. This information includes standard one-dimensional regular expression patterns that are placed at the beginning and end of a block, respectively, data indicating the maximum number of lines which is permitted between the patterns, and data indicating the type of tag added to the block that is determined as a two-dimensional regular-expression block. The regular expressions may be registered in advance. Any addition, modification, or deletion may be made to, on, or from the registered information by a user in the regular-expression register 30.

In the example shown in FIG. 15, in a block starting with double "((black star)", namely, "((", and ending with the corresponding end pattern "((", if five text lines or less are between these patterns, it is determined that the starting and end patterns correspond to the start and end of the block, respectively, and are tagged with tags <TC_TSF_BLOCK> and </TC_TSF_BLOCK> indicating a block. The tags <TC_TSF_BLOCK> and </TC_TSF_BLOCK> indicating a block use parameter "type=101" to indicate that a section enclosed by the pair of tags is block-structured data based on the two-dimensional regular expression of Type=101. In this example, the block-structured data based on a two-dimensional regular expression also indicates a heading, and is also tagged with a tag using parameter "tag=HEAD".

As shown in FIG. 14B, further, for example, if text data contains a line in which any combination of symbols "\", "–", and "+", and alphabetic letters "A" to "Z" is repeated in a continuous manner and which ends with the corresponding end pattern, the line is identified as a block. Then, the line is tagged with tags <TC_TSF_BLOCK> and </TC_TSF_BLOCK> indicating a block. The tags <TC_TSF_BLOCK> and </TC_TSF_BLOCK> indicating a block use parameter "type=101" to indicate that a section enclosed by the pair of tags is block-structured data based on the two-dimensional regular expression of Type=101. In this example, the block-structured data base on a two-dimensional regular expression also indicates a horizontal rule, and is also tagged with a tag using parameter "tag=HR".

The data registered in the regular-expression register 30, and the regular-expression determining unit 29 can be used for the general purpose, and are shared by the block dividing unit 10 and the document structuring unit 21 for tagging, as described above. Then, in a tag corresponding to block-structured data and a tag corresponding to sentence-structured data, a regular expression described therein is checked. Therefore, it is automatically determined which process of the block dividing unit 10 or the document structuring unit 21 the described data is used for, by using a tag added thereto.

After the process in steps S209 to S211, the process proceeds to step S212. In step S212, it is determined whether or not the text data to be processed has been completely processed. If it is determined that the processing for the text data has not been completed, the process returns to step S200. If it is determined that the text data has been completely processed, the series of process for dividing data into blocks ends.

If it is determined in step S200 that the text data is not in a plain text format, the process proceeds to step S220. In this case, the text data is in a tagged text format. In step S220, it is determined by the used-tag determining unit 18 whether or not an unwanted tag that is not used in the document processing apparatus 300 is embedded in the text data in a tagged text format (hereinafter referred to as a "tagged text").

A tag embedded in the tagged text is detected, and it is determined in step S221 whether or not the detected tag is used for sentence extraction in the document processing apparatus 300. If it is determined that the detected tag is not used, the process proceeds to step S222, in which that tag is deleted. A tag paired with that tag would also be deleted. If the unwanted tag is deleted or if it is determined in step S221 that the detected tag is used, the process proceeds to step S209.

FIGS. 16A and 16B show how an unwanted tag is deleted from tagged text. In the tagged text shown in FIG. 16A, tags are detected line-by-line. Then, it is determined by the used-tag determining unit 18 whether or not the detected tag is a tag registered in the used-tag register 19. FIG. 17 shows a list of used tags which are registered in the used-tag register 19. In the table shown in FIG. 17, used tags are listed in the left column, and non-use tags to be deleted are listed in the right column. In the example shown in FIG. 17, the closing tags corresponding to the registered tags, and a parameter used in the starting tags are not shown. The used tags and the non-use tags may be registered in advance. Any addition, modification, or deletion may be made to, on, or from the registered tags by a user in the used-tag register 19.

By referring to the list of the used tags, an unwanted tag to be deleted is detected in the tagged text shown in FIG. 16A. In the example shown in FIG. 16A, tag <!-- ... --> indicating a comment and tag <A> indicating reference of other documents are registered as non-use tags, and these tags and the corresponding closing tags are deleted, resulting tagged text shown in FIG. 16B, by way of example.

Although not shown in the flowchart of FIG. 6, a character position tag indicating the character position on each line of original text data is added by the character position memory 16. FIGS. 18A and 18B show tagging for the character position on each line. A tag at the beginning of each line indicates the character position on that line. Parameter "pos=nn", where nn denotes a numerical value, indicates at what number of byte of data from the beginning of a block containing the line in that block the beginning of the line is positioned. Parameter "top=nn" indicates to what number of line the line corresponds in a block containing the line. Parameter "left=nn" indicates with what number of data from the left the line starts. Parameter "right=nn" indicates at what number of byte of data from the left end of the line is positioned. Although not shown in FIG. 18B, parameter "row=nn" indicates the number of lines of data in a block. Parameter "cols=nn" in the tag <TC_TSF_BLOCK> indicates the maximum number of characters per line in a block.

In tagged text such as HTML, a formatted-text section enclosed by tags <PRE> and </PRE> may be subject to the same process as the process for dividing text data in a text format into blocks, such as the process in steps S201 to S211 in FIG. 6.

In this way, the text data is block-structured by the block dividing unit 10. The block-structured text data is stored in the block-structured-data storage 20. The text data is tagged with tag <?TSF ... ?> unique to the document processing apparatus 300 indicating data that is divided into blocks. The block-structured text data may also be stored in an external storage device via the disk drive 122 or the external I/O 123.

If it is determined by the text-format determining unit 5 that the input text data stored in the conversion buffer 9 is a tagged text in a non plain text format, the input text data is tagged with the tag <?TSF ... ?>, and is stored in the block-structured-data storage 20 in the same manner as block-structured text data.

The text data may be stored in the block-structured-data storage 20 with a comment such as tag <!-- ... --> in tagged language such as HTML being removed from the text data.

The present invention is not limited to the order of the process in the flowchart of FIG. 6. In the flowchart of FIG. 6, the process may be broken into four sections, namely, steps S201 to S203 to check for a ruled-line character, steps S204 to S206 to check for a horizontal-rule character, steps S207 to S208 for a block break using a blank line, and steps S209 to S211 to check for a regular expression. These sections are interchangeable in order.

Following the process in step S30' in FIG. 4, the block-structured data is tagged in each block to structure the document. That is, the block-structured data is passed to the document structuring unit 21 by the controller 1 in order to convert the block-structured data into tree-structured tagged text.

Figure 19:
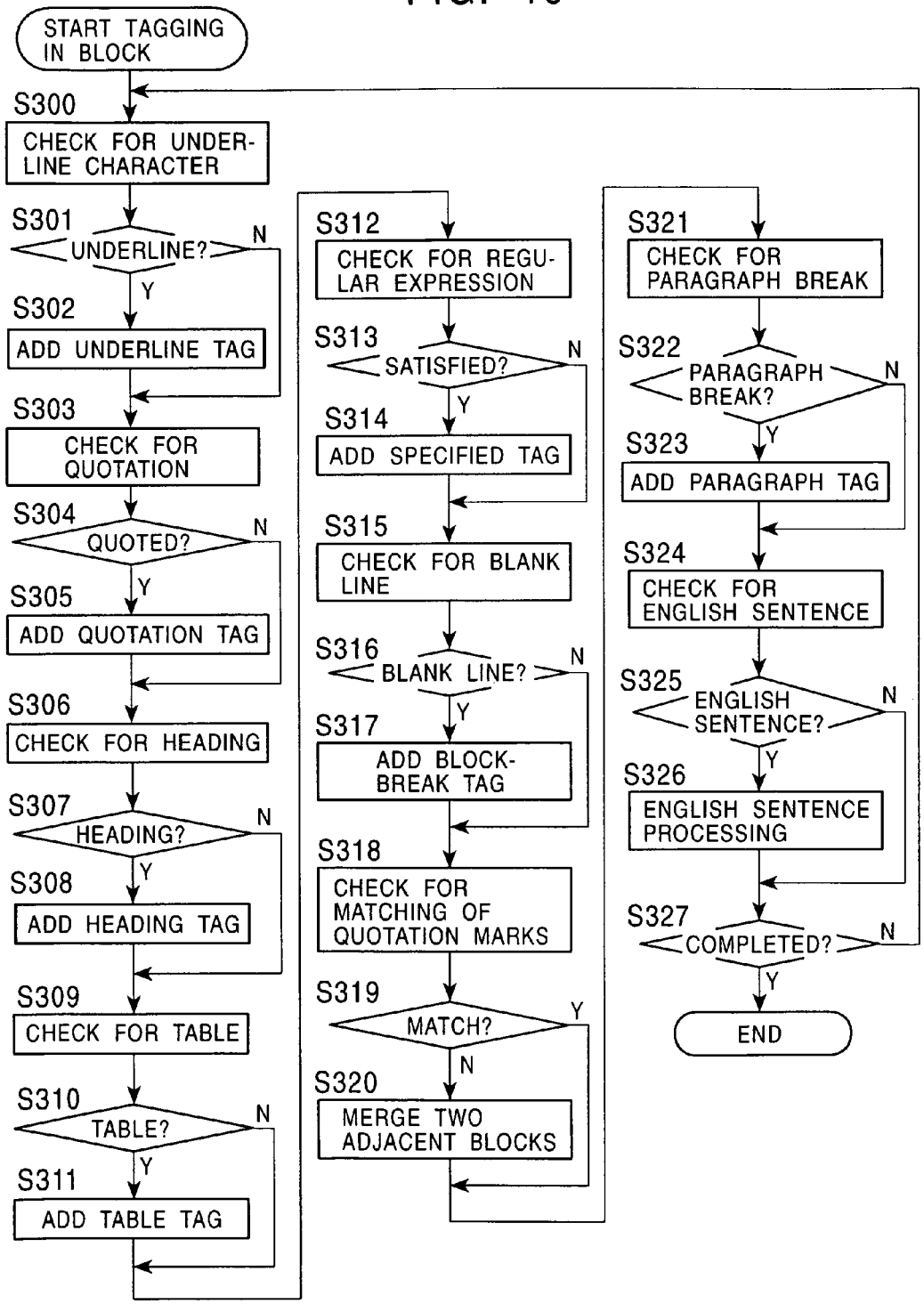
FIG. 19 is a flowchart of a process for structuring a document.

FIG. 19 is a flowchart of a process for structuring the document which is performed by the document structuring unit 21. The process in the flowchart of FIG. 19 is executed block-by-block in the block-structured data, and, in each block, is executed line-by-line.

In step S300, it is determined by the underline determining unit 22 whether or not a underline character is contained in the block-structured data. A character string which it is determined in step S301 that is specified by an underline character is tagged with an underline tag indicating an underlined character string. As used herein, the "underline character" means a character which appears as underlining the character thereabove. The underline character is used to emphasize the character above the underline character.

FIGS. 20A and 20B shows how a character string emphasized with an underline by underline characters is tagged with an underline tag indicating underline emphasis. As shown in FIG. 20A, underline characters are inserted to the block-structured data to emphasize character strings or a phrase "cherry trees". The underline characters may be "☐P" or "~", and are inserted on a line below the line containing a character string or character strings to be emphasized by the underline characters.

Figure 21:
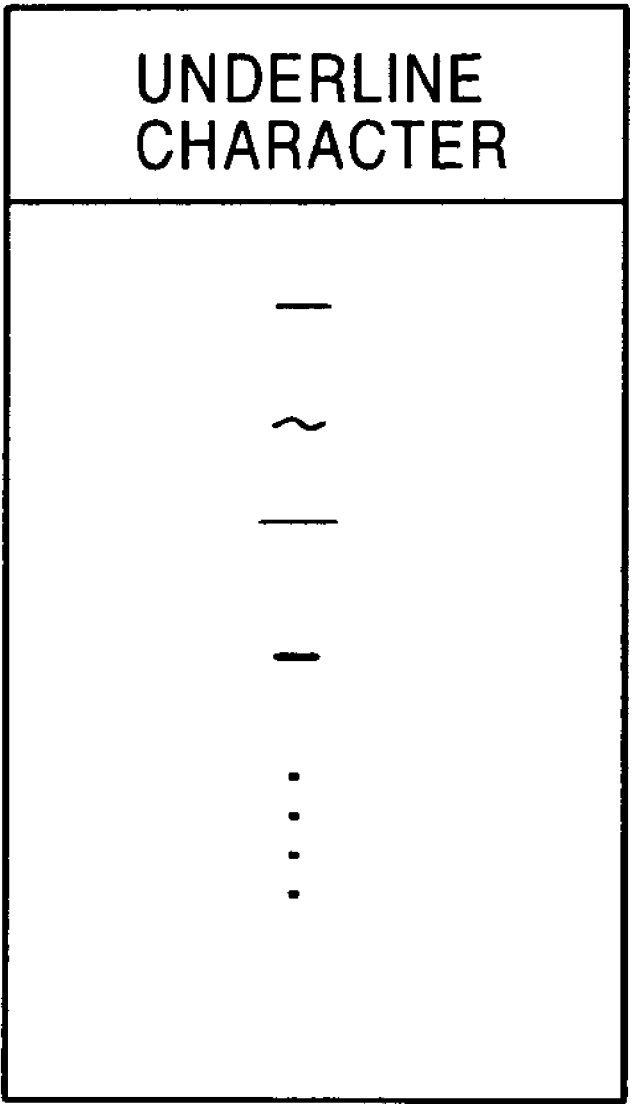
FIG. 21 is a table of underline characters registered in an underline character register.

The underline determining unit 22 refers to underline characters registered in the underline character register 23 to check for an underline character. FIG. 21 shows underline characters registered in the underline character register 23. More than a predetermined number of underline characters appear in a continuous manner to underline the character string above the underline characters, and the character string is identified as being emphasized. The underline characters may be registered in advance. Any addition, modification, or deletion may be made to, on, or from the registered underline characters by a user the underline character register 23.

Once an underline character has been specified in this way, the character string emphasized by the underline character is tagged with underline tags <EM underline="□P"> and </EM> indicating underline emphasis. Furthermore, the line containing the underline character can be deleted, or can be removed after a predetermined comment is added thereto. The underline tag indicates that an underline character quoted with " " in a parameter is used for underline emphasis.

After the process in steps S300 to S302, the process proceeds to step S303, in which it is determined by the quotation determining unit 24 whether or not a quotation character is placed at the beginning of a line in the block-structured data. In step S304, it is determined whether or not a line (character string) into the quotation character is inserted at the beginning of the line is quoted in, for example, an e-mail message. If YES is obtained, then, in step S305, the quotation character of that line is removed, and a quotation tag indicating which type of the quotation character is added to that line.

FIGS. 22A and 22B show tagging for a character string which uses a quotation character indicating a quotation from a different document. In this example, symbol "?" is used as a quotation character, and is inserted to the beginning of a quoted line or character string.

Figure 23:
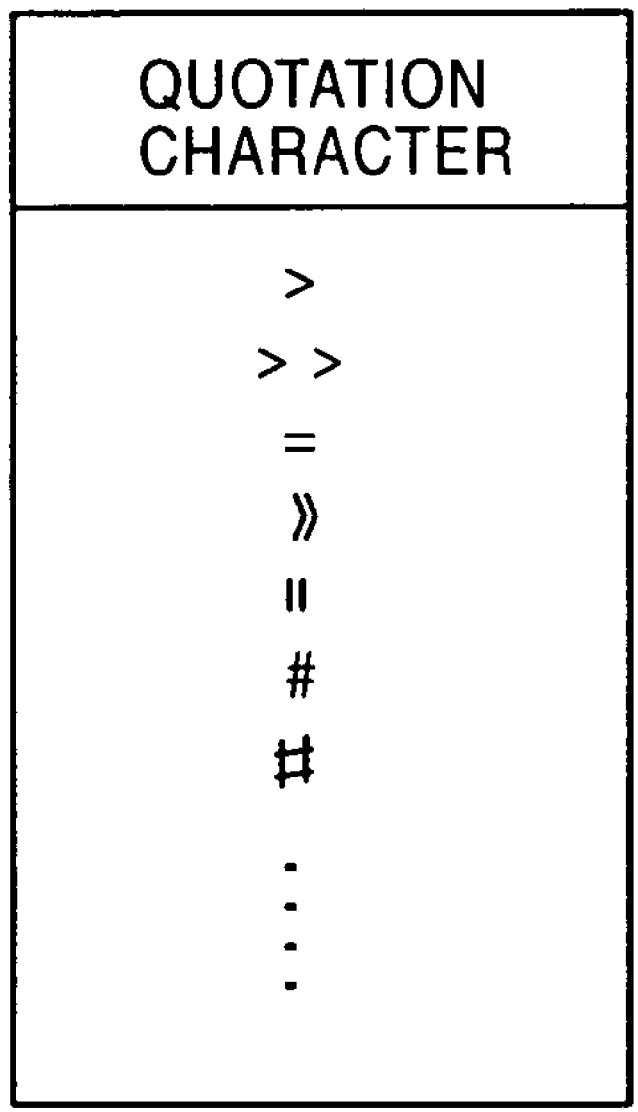
FIG. 23 is a table of quotation characters registered in a quotation character register.

The quotation determining unit 24 refers to quotation characters registered in the quotation character register 25 to check for a quotation character. FIG. 23 shows quotation characters registered in the quotation character register 25. If a registered quotation character appears at the beginning of two lines or more, it is determined that the lines at the beginning of which that quotation character is inserted are quoted lines of, for example, an e-mail message. As shown as an example in FIG. 22B, a line identified as a quoted line has a quotation character removed therefrom, and is tagged with quotation tags <BLOCKQUOTE header="?"> and </BLOCKQUOTE> indicating a quotation. The quotation tags indicate that a section enclosed thereby is a quoted section, and uses parameter "header" to indicate what type of quotation character is inserted to the section. That is, a character or symbol used as a quotation character is quoted with in parameter "header="?"".

In an embodiment of the present invention, as shown in FIG. 22B, once a quoted section has been specified, this quoted section is enclosed by quotation tags, and is further enclosed by tags <P> and </P> indicating a paragraph in HTML and by tags <PRE> and </PRE> indicating formatted text. In the block-structured data, tags <TC_TSF_BLOCK> and </TC_TSF_BLOCK> indicating a block are deleted.

A quotation character added to original block-structured data may also be tagged with a tag indicating a quotation character. FIGS. 24A and 24B show an example in which quotation characters are tagged. Quotation characters are detected in data shown in FIG. 24A, and the quotation characters themselves are tagged with tags <QUOTE> and </QUOTE> indicating a quotation character, as shown in FIG. 24B.

A tag indicating a quotation character may use a parameter indicating an attribute of quotation, such as a quoted person or the depth of quotation, according to the type of quotation characters, duplication of a quotation character, etc., in the original data.

Although a section having two lines or more at the beginning of which a quotation character is inserted is identified as a quoted section in the above description, the present invention is not limited to this form. For example, a section which spans more than a specified number of series of lines at the beginning of which a quotation character is inserted may also be identified as a quoted section. The number of lines may be specified by a user, or may be previously determined.

Furthermore, in block-structured data of input text, any block containing a quotation, and the other blocks may also be identified as a quotation even though a line starting with a registered quotation character does not continuously appear in the block-structured data. Thus, if two ore more consecutive lines containing a quotation are located at any position in the block-structured data, only one line containing the quotation may also be identified as a quoted line. Furthermore, any number of lines starting with a quotation may be identified as a quoted line.

After the process in steps S303 to S305, the process proceeds to step S306. In step S306, it is determined by the heading determining unit 26 whether or not the block-structured data contains a heading. A heading line is checked for in step S307, and is then tagged with a tag indicating a heading line in step S308.

Figure 26:
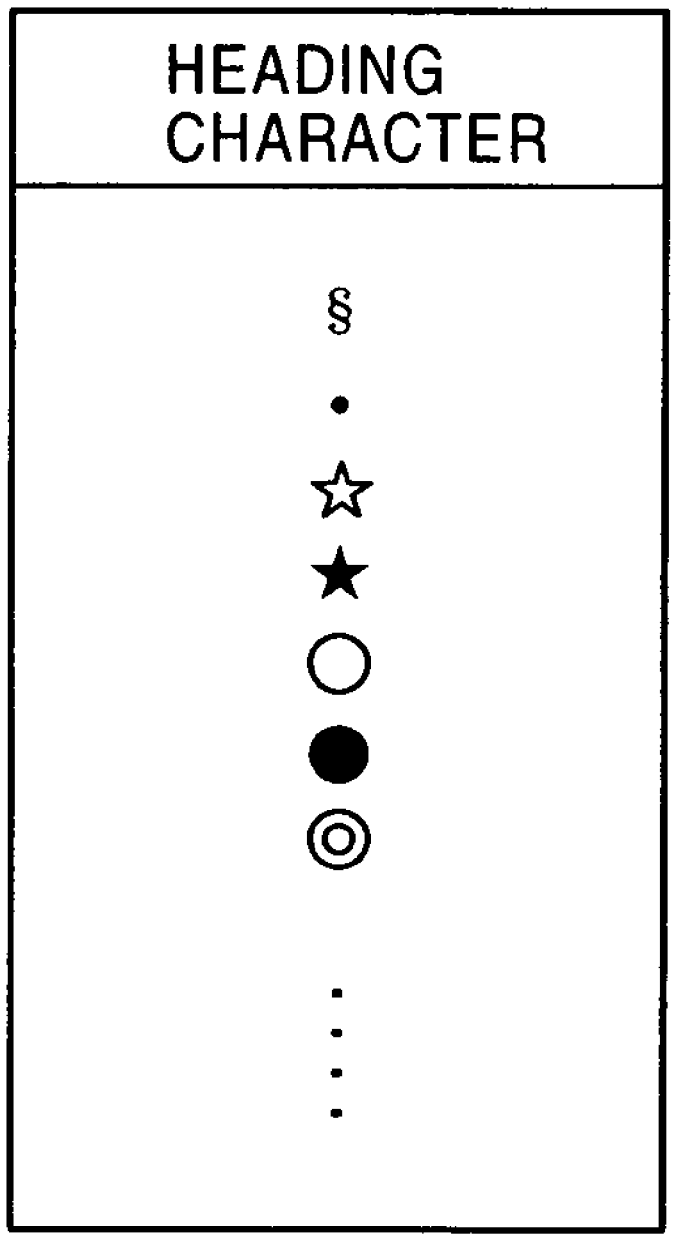
FIG. 26 is a table of heading characters registered in a heading character register.

FIGS. 25A and 25B show tagging for a heading line which is detected. As shown in FIG. 25A, symbol "(double circle)" is used as a heading character in the block-structured data to indicate that the line containing this heading character is a heading line. A heading character is checked by referring to heading characters registered in the heading character register 27. FIG. 26 shows heading characters registered in the heading character register 27. When a character identical to a registered heading character appears at the beginning of a line in a block, that line is identified as a heading line. The heading characters may be registered in advance. Any addition, modification, or deletion may be made to, on, or from the registered heading characters by a user in the heading character register 27.

Once a heading line has been specified in this way, as shown as an example in FIG. 25B, the heading line is tagged with tags <HEAD> and </HEAD> indicating a heading line. It is determined that a line is a heading line if that line contains a heading character and if a character wrapping to the next line, such as comma ",", is placed at the end of that line.

According to an embodiment of the present invention, as shown in FIG. 25B, once a heading line has been specified, in a block containing the heading line, the specified heading line is enclosed by tags indicating a heading line, while the other lines in that block are enclosed by tags <P> and </P> indicating a paragraph in HTML and by tags <PRE> and </PRE> indicating a formatted text in HTML. In that block, tags <TC_TSF_BLOCK> and </TC_TSF_BLOCK> indicating a block are deleted.

Based on the character position indicated by a character position tag or the number of characters on a line, the heading determining unit 26 determines whether or not a line in a block includes a centered or indented character string to check for a heading according to the result. FIGS. 27A and 27B show that a centered character string is identified as a heading. As shown in FIG. 27A, if character string "Question" is a centered character string, it is determined that the line containing this character string is a heading line, and the line is tagged with a tag indicating a heading line, as shown in FIG. 27B.

Based on the character position indicated by a character position tag, the heading determining unit 26 may also determine whether or not a line in a block is shifted to the left with respect to the other lines in that block to check for a heading. FIGS. 28A and 28B show that a character string is identified as a heading based on the character position. As shown in FIG. 28A, if a character string "Question" is shifted to the left with respect to the other lines in that block, it is determined that the line containing this character string is a heading line, and the line is tagged with a tag indicating a heading line, as shown in FIG. 28B.

The heading determining unit 26 may also determine whether or not a line in a block is a line including a character string bracketed with predetermined symbols to check for a heading. For example, it is determined whether or not a character string bracketed with a pair of predetermined brackets terminates within a line. FIGS. 29A and 29B show that a bracketed character string is identified as a heading. As shown in FIG. 29A, if a character string "Question" is bracketed with square brackets, it is determined that the line containing this character string is a heading line, and the line is tagged with a tag indicating a heading line, as shown in FIG. 29B.

A bracket indicating a heading line may be registered by a user as desired, or may be registered in advance. Any addition, modification, or deletion may be made to, on, or from user-registered brackets.

Figure 30A:
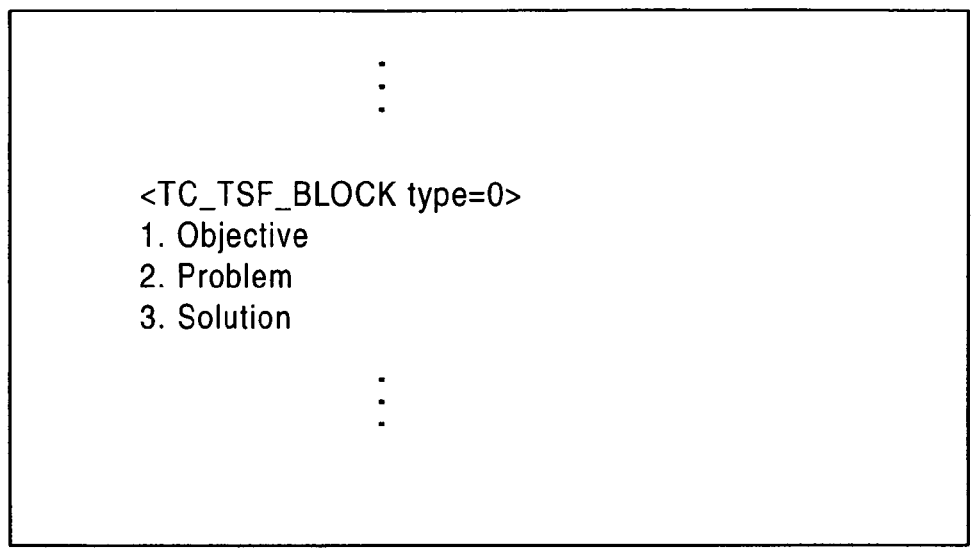
FIGS. 30A and 30B are views schematically showing list items.
Figure 30B:
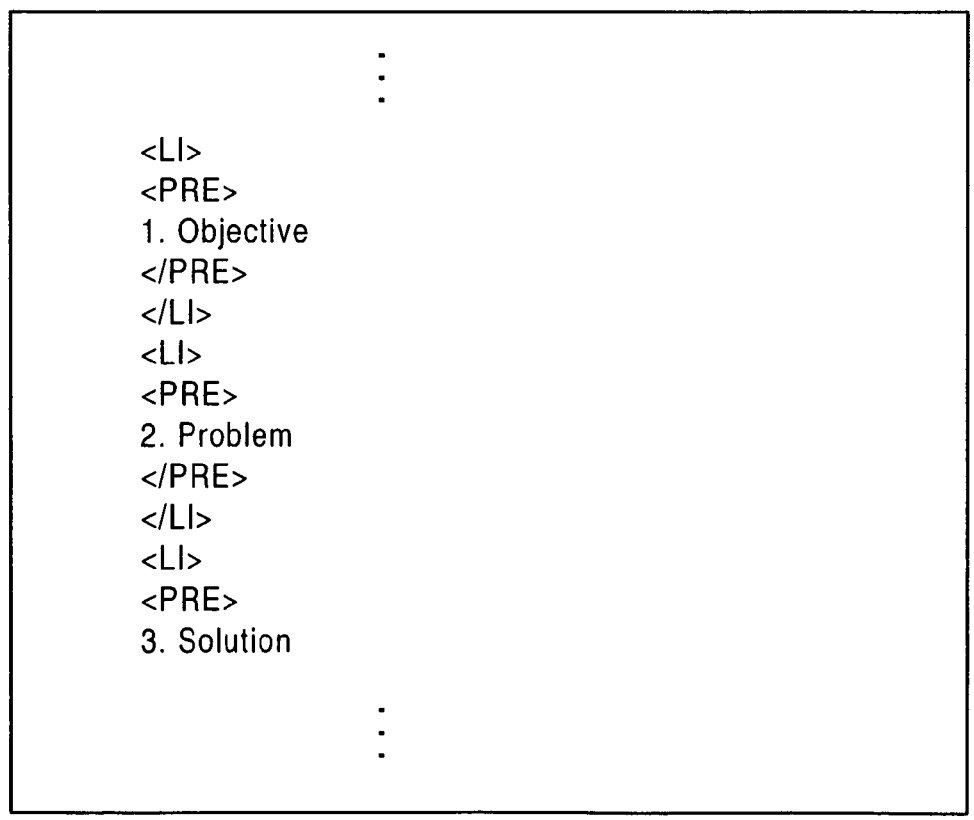

If lines each of which is identified as a heading line according to the above-noted heading determining process appears in a sequential manner under the same condition, the heading determining unit 26 may further determine that these lines form list items, and the lines are then tagged with a tag. FIGS. 30A and 30B show list items. In the block shown in FIG. 30A, "1.", "2.", and "3." are registered as heading characters to identify lines containing the heading characters as heading lines. Since the lines identified as heading lines appear in a sequential manner under the same condition, it is determined that the lines are list items. Then, the lines are tagged with tags <LI> and </LI> indicating a list item in HTML, as shown in FIG. 30B.

After the process in steps S306 to S308, the process proceeds to step S309, in which it is determined by the table determining unit 28 whether or not a table is contained in the block-structured data. If the block-structured data is in a tagged text format, for example, in an HTML format, and the block-structured data is tagged with tags <TABLE> and </TABLE> indicating a table in HTML, it is determined that the data contains a table, and the tags are used without change.

If the block-structured data is in a plain text format, in step S310, ruled lines detected by the ruled-line character determining unit 13 in steps S201 to 203 in FIG. 6 are used to detect cells that configure a table to extract a cell from the table. FIG. 31 shows a table formed by ruled-line characters contained in the block-structured data. In the block-structured data, the table shown in FIG. 31 is tagged with tags <TC_TSF_BLOCK type=10> and </TC_TSF_BLOCK> indicating a ruled-line character, as described above with reference to FIG. 7B. Ruled-line characters are extracted based on the tags to analyze the type of the ruled-line characters used and the viewing position of the ruled-line characters, so that the a cell can be extracted from the table.

For example, all lines enclosed by tags indicating a ruled-line character are scanned to extract lines consisting of ruled-line characters, and lines containing a mixture of ruled-line characters (vertical ruled-lines in this example) and normal characters. It is also determined whether or not the scanned portions are surrounded by the ruled-line characters. A section surrounded by ruled-line characters may be identified as a table. The position at which vertical ruled-lines appear on each line is recorded, and the maximum number of cells is calculated. Based on the position of vertical ruled-lines and the maximum number of cells in row, it is determined whether or not cells are connected in row. The table is thus parsed.

In step S311, an extracted cell is tagged with, for example, tags indicating a table in HTML. FIG. 32 shows that the table shown in FIG. 31 is segmented into cells which are extracted and then tagged with tags indicating a table. The extracted cells are enclosed by tags <TD> and </TD>. The cells aligned in the same row are enclosed by tags <TR> and </TR>.

In the example shown in FIG. 32, character strings in each cell are handled as a block. A cell spanning a plurality of rows or columns would be tagged with a tag <TD> which uses parameter "rowspan="nn"" or "colspan="nn"" indicating what number of rows or columns the cell spans. In the example shown in FIG. 32, a cell, such as "Software 1", "Software 2", or "Software 3", which spans a plurality of rows, as shown in FIG. 31, is identified as a cell spanning a plurality of rows (three rows in this example), and is tagged with a tag <TD rowspan="3">.

After the process in steps S310 to S311, the process proceeds to steps S312, in which a regular expression contained in the text data is checked by the regular-expression determining unit 29. The regular-expression determining unit 29 executes the same process as the process in steps S209 to S211 in FIG. 6 which is executed by the block dividing unit 10. In step S313, the data registered in the regular-expression register 29 is searched for only data satisfying conditions relating to the tags to be processed by the document structuring unit 21. As a result of search, in step S314, the data satisfying the conditions is tagged with specified tags.

FIGS. 33A and 33B show regular expressions in the block-structured data. FIG. 33A shows the same contents as that in FIG. 14A, showing block-structured data after the process in steps S209 to S211 in FIG. 6. After the process in steps S312 to S314, the block-structured data is tagged with tags <HR> and </HR> and tags <HEAD> and </HEAD> indicating a horizontal rule based on a regular expression, in place of tags <TC_TSF_BLOCK type=101 tag=HR> and </TC_TSF_BLOCK>, and tags <TC_TSF_BLOCK type=101 tag=HEAD> and </TC_TSF_BLOCK>, as shown in FIG. 33B.

The tagging process in steps S312 to S314 is performed after a block based on a regular expression, as shown in FIG. 14, by the block dividing unit 10.

After the process in steps S312 to S314, the process proceeds to step S315, in which a blank line for a block break in each block is checked by the blank-line determining unit 31. FIGS. 34A and 34B show a block break using a blank line.

In the flowchart of FIG. 5, if the block-structured data is in a plain text format, a block break has been performed in steps S207 and S208 in FIG. 6 by the block dividing unit 10.

If the block-structured data is in a tagged text format, however, a block into which the data is once divided may be potentially divided into sub-blocks at a blank line, as shown in FIG. 34A, by way of example. Then, in step S316, it is determined whether or not the block contains a blank line. If YES is obtained, then, in step S317, the block is further divided into sub-blocks at the blank line in the block, and the divided sub-blocks are tagged with a tag indicating a block. In this example, the sub-blocks are tagged with tags <P> and </P>, and tags <PRE> and </PRE>.

After the process in steps S315 to S317, the process proceeds to step S318, in which the matching of quotation marks in a block or blocks is checked by the quotation-mark determining unit 32. FIGS. 35A and 35B show how matching of quotation marks is checked by the quotation-mark determining unit 32. For example, as shown in FIG. 35A, if a pair of quotation marks are placed in two blocks, it is determined that the quotation marks do not match in a block. In step S318, matching of quotation marks in a block is checked, and it is determined in step S319 whether or not the quotation marks match. If it is determined that the quotation marks do not match in the block, the process proceeds to step S320, in which matching of the quotation marks in that block and the adjacent block is checked. If the quotation marks match in the block and the adjacent block, these blocks are merged into one block, as shown in FIG. 35B.

After the process in steps S318 to S320, the process proceeds to step S321, in which a paragraph break in a block is checked by the paragraph determining unit 33. The paragraph determining unit 33 checks for the position at which each line starts in a block. If lines start at two different positions in a block, it is determined that a line starting at a position shifted to the right with respect to the other position introduces a new paragraph. Then, the block is divided into sub-blocks.

A threshold shifting amount by which it is determined that a line introduces a new paragraph is predefined, and is stored in the HDD 114 or the like. If the shifting amount of a line is over this threshold, it is determined that the line does not introduce a new paragraph.

FIGS. 36A and 36B show that a block is divided based on a paragraph break. In step S321, a line whose start position is shifted to the right in the block shown in FIG. 36A is determined. For example, if it is determined in step S322 that the shifting amount of the line is within the threshold, and it is determined that a paragraph break is formed before the line, then, in step S323, the line is tagged with a tag indicating a paragraph. FIG. 36B shows that tags indicating a paragraph are added. In this example, tags <P> and </P> and tags <PRE> and <PRE>, which indicate a paragraph, are added to the sub-blocks into which the block is divided at a paragraph break.

The position information for each line which is stored in the character position memory 16 may be used to check for a paragraph break.

After the process in steps S321 to S323, the process proceeds to step S324, in which an English sentence is checked by the English-sentence determining unit 34. In step S325, it is determined whether or not a line in a block consists of alphanumeric characters or symbols. If YES is obtained, then, it is determined that the line is an English line.

If an English line continuously appears in a block, in step S326, end-of-line processing for English-sentence processing is performed. Specifically, if a line ends with the hyphen ("-"), the hyphen and the carriage return symbol next thereto are deleted so that the end-of-line word wraps to the first word of the next line into one word. If a line does not end with a delimiter such as the comma (",") or the period ("."), but ends with an English word, a white space is inserted between the end-of-line word and the first word of the next English line, while the carriage return symbol is deleted from the line. A tag <POS . . . eol=1 or 0> indicates a relationship between a line and the next line. Parameter "eol=1" indicates that a line is continued to the next line.

Accordingly, after the process in steps S300 to S326, the process proceeds to step S327, in which it is determined whether or not, for example, the document data stored in the document data storage 4 has been completely processed. If it is determined that any block has not been processed, the process proceeds back to step S300 to perform the sequence of process on the unprocessed block.

The present invention is not limited to the order of the process in the flowchart of FIG. 19. In the flowchart of FIG. 19, the process may be broken into nine sections, namely, steps S300 to S302, steps S303 to S305, steps S306 to S308, steps S309 to S311, steps S312 to S314, steps S315 to S317, steps S318 to S320, steps S321 to S323, and steps S324 to S326. These sections are interchangeable in order.

If it is determined that all the input document data has been completely processed, lines, such as Japanese lines, which are identified as non-English lines by the English-sentence determining unit 34 and in which the carriage return symbol still remain in an untagged form in the block are all continued. A white space, as a character string, at the end of a line or at the beginning of a line is deleted, and the presence of a white space is recognized based on the start position of the line and the number of characters on the line. A tag <pos . . . eol=1 or 0> indicates a relationship between a line and the next line. Parameter "eol=1" indicates that a line is continued to the next line.

The document structuring unit 21 segments each block into sentences based on the period ("."). FIGS. 37A and 37B show that a block is segmented into sentences based on the period ("."). The block shown in FIG. 37A is segmented into sentences based on the period ("."), and the resulting sentences are then tagged with a predetermined tag, as shown in FIG. 37B.

The block shown in FIG. 37A is segmented into sentences every period ("."). Each of the segmented sentences is tagged with tags <PRE> and </PRE>, thus indicating one sentence. If a line break occurs in one sentence, the tag <pos . . . eol=1> indicates the line-break position, or the end-of-line position, and indicates that the line continue to the next line.

Through the foregoing process, a document is structured with a tag using a sentence as a minimum unit to generate sentence-structured data. Accordingly, each block segmented into sentences is tagged with a document format assertion tag <?SSF . . . ?> unique to the document processing apparatus 300 indicating sentence-structured data.

The sentence-structured data tagged with a document format assertion tag <?SSF . . . ?> is stored in the sentence-structured-data storage 35. As an alternative, the sentence-structured data may be stored in, for example, a storage medium external to the document processing apparatus 300 via the disk drive 122 or the external I/O 123. The sentence-structured data may also be transmitted to an external network via the communication I/F 115, and may be stored in another storage connected to the network.

Accordingly, the input text is determined in type, and is converted into structured text which is tagged so as to be processed sentence-by-sentence in a uniform character coding. In the above description, a so-called filter system for converting plain-text data which cannot be processed sentence-by-sentence into tagged text such as HTML text has been introduced. Now, a system for processing structured text which has been converted is described.

According to the present invention, sentence-structured data, which can be processed sentence-by-sentence, is structured into a tree, for example, according to tags added to the data. A template which is used to determine whether or not a sentence is extracted according to the type of tags may be used. An action tag indicating the process of an application on an extracted sentence, which is allocated to each tag, may be used.

Figure 38:
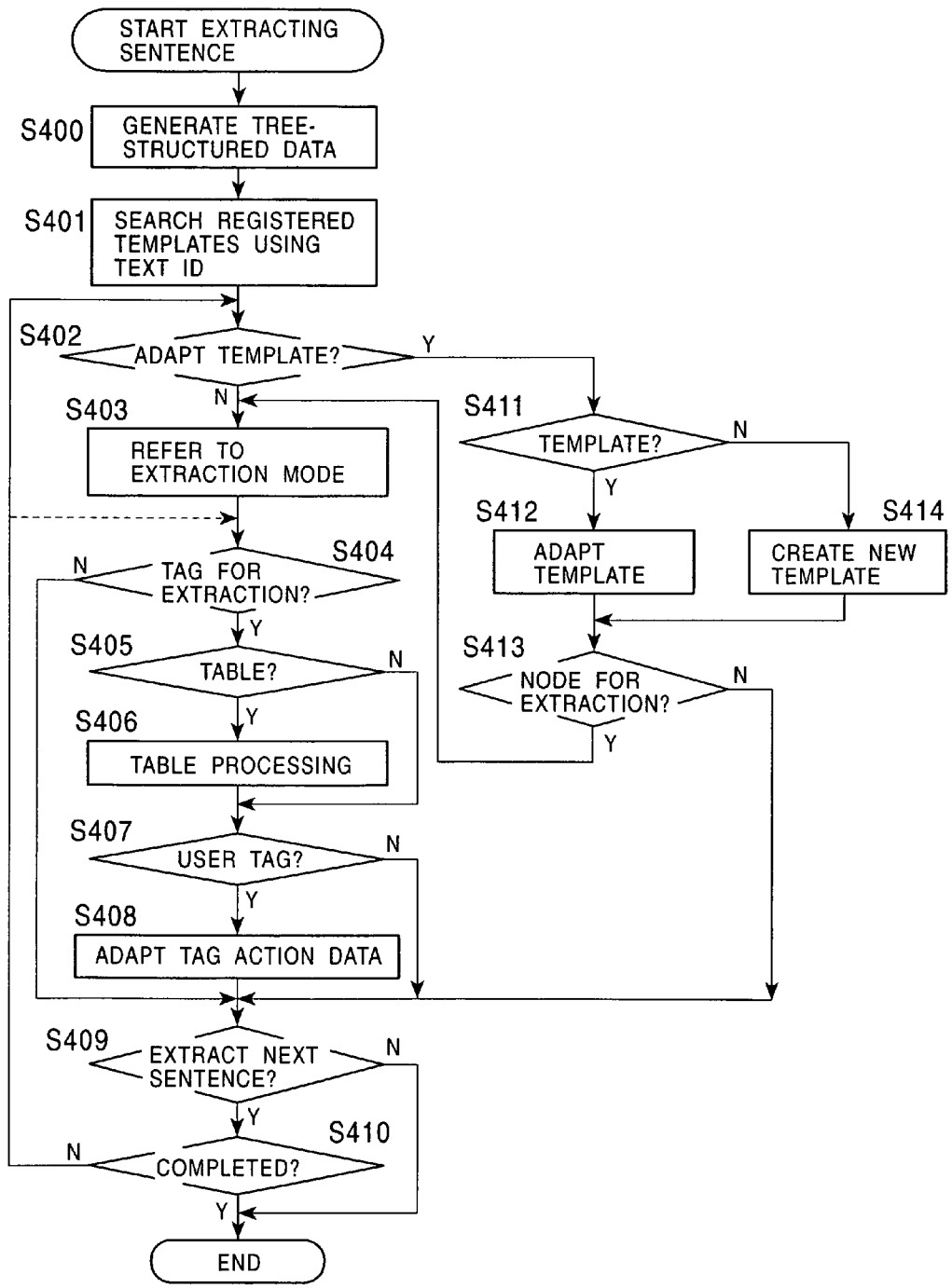
FIG. 38 is a flowchart of a process for extracting a sentence from tree-structured data according to an embodiment of the present invention.
Figure 39:
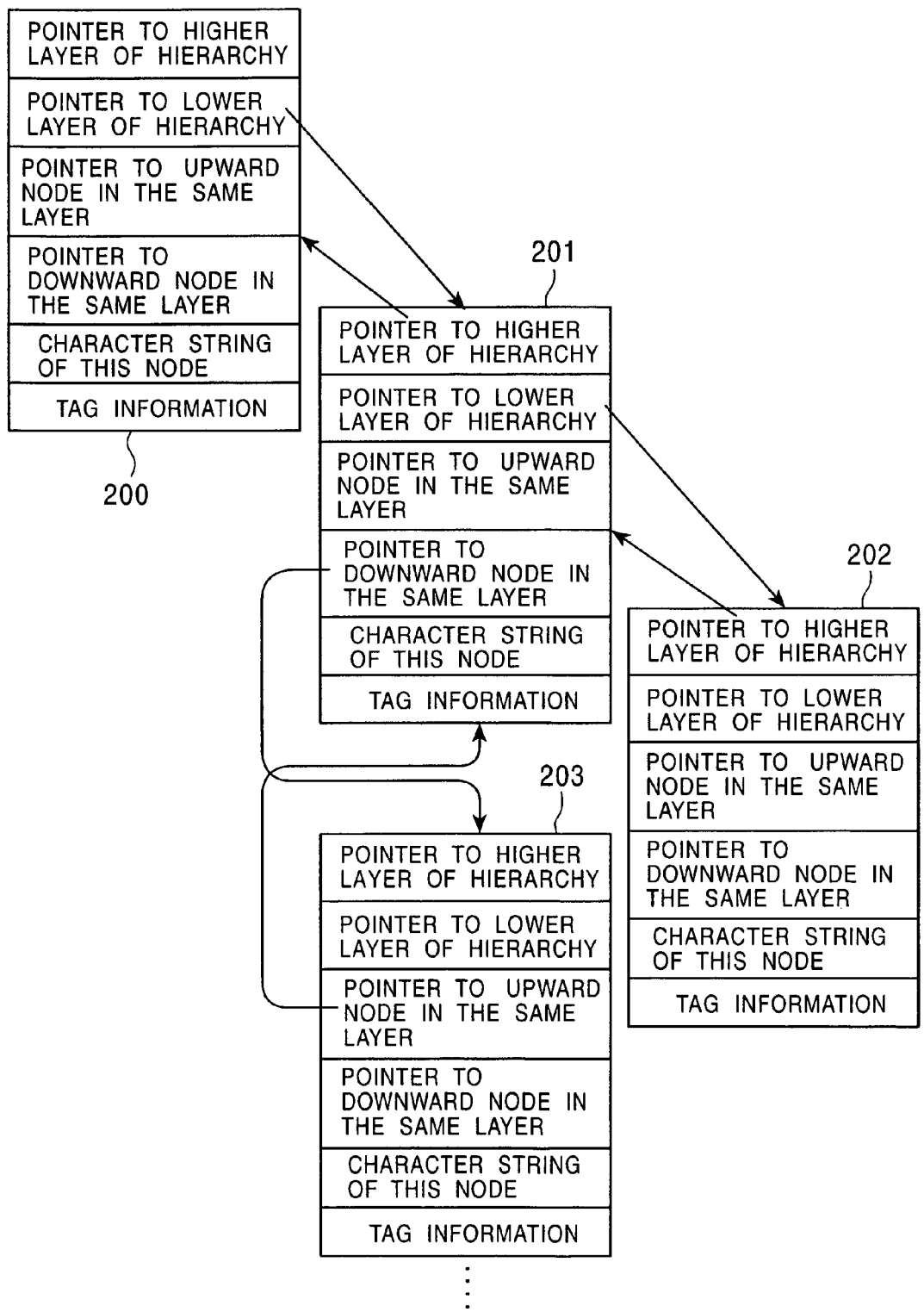
FIG. 39 is a schematic view of example tree-structured data.

FIG. 38 is a flowchart of a process for extracting a sentence from tree-structured sentence-structured data. In step S400, tree-structured data is generated from sentence-structured data. FIG. 39 schematically shows example tree-structured data. Each of data 200, 201, 202, and 203 includes "pointer to higher layer of hierarchy" and "pointer to lower layer of hierarchy", which represent position information indicating higher/lower (previous/next) layers of hierarchy, "pointer to upward node in the same layer" and "pointer to downward node in the same layer", which represent position information indicating previous/next tagged information in the same layer, "character string of this node" which forms the substantial body of the data, and "tag information" indicating a tag which is added to the "character string of this node".

A higher (previous) layer of hierarchy is located more at the left side in FIG. 39. Thus, the data 200, 201, and 202 are arranged in this order as to the arrangement of sentences, and layers of hierarchy are arranged in this order. A high and low (previous and next) relation in the same layer of hierarchy is also defined, such that an earlier sentence in the same layer is higher (previous). The data 201 and 203 are in the same layer, and the data 201 appears earlier. A tree structure is established based on the high and low (previous and next) relation. In a tree structure, the data 200, 201, 202, and 203 are referred to as nodes.

Referring back to FIG. 38, in step S400, sentence-structured data is structured into a tree according to the tags added to the sentence-structured data and the sequence of the sentence-structured data. The sentence extractor 36 extracts a sentence using the tree-structured data, and the tree-structured data facilitates migration in a unit of layer and migration in a unit of sentence in the same layer of hierarchy in order to extract a new sentence.

Once tree-structured data is generated, the process proceeds to step S401. As described above, according to an embodiment of the present invention, a template may be used to extract a sentence from tree-structured data. A template is registered in the template register 43, for example, according to the instruction of a user, and is stored in the sentence-extraction-template storage 44. In step S401, a template adaptable to the tree-structured data generated in step S400 is searched from the registered templates. Such a template is searched based on a text ID added to the data to be processed. The template and template search are described below.

In step S402, it is determined whether or not the searched template is adapted. If it is determined that the template is adapted according to the instruction of a user, the process proceeds to step S411. The process in step S411 and the subsequent steps to adapt or create a template are described below. If it is determined that the template is not adapted, the process proceeds to step S403.

In step S403, the extraction mode 42 is referred to. Using the extraction mode 42, it is determined whether or not a sentence is extracted with respect to a tag added to data. FIG. 40 shows examples of the extraction modes 42. It can be determined whether or not a sentence is extracted with respect to each element corresponding to each tag. In this example, a sentence tagged with a tag corresponding to the element that is turned "ON" is extracted, while a sentence tagged with a tag corresponding to the element that is turned "OFF" is not extracted.

The extraction mode 42 is specified according to the instruction of a user, and is stored in, for example, the HDD 114. Alternatively, an extraction mode 42 in which each element is turned "ON" or "OFF" may also be stored as default extraction mode 42 in advance in, for example, the HDD 114.

Then, tags are sequentially detected, and it is determined in step S404 whether or not a detected tag is a tag for extraction. If it is determined that the detected tag is not a tag for extraction, the process proceeds to step S409.

If it is determined in step S404 that the detected tag is a tag for extraction, the process proceeds to step S405. In step S405, it is determined whether or not the tag indicates a table. If it is determined that the tag does not indicate a table, the process proceeds to step S407. If it is determined that the tag indicates a table, the process proceeds to step S406, in which table processing is performed.

As described above, a table is tagged by the document structuring unit 21 for each cell. Thus, the sentence extractor 36 can extract a sentence for each cell row-by-row or column-by-column from tree-structured data. As described above with reference to FIGS. 31 and 32, a sentence can be extracted for each cell according to the tags <TD> and </TD>, and can be extracted row-by-row or column-by-column according to the tags <TR> and </TR>. Such table processing in step S406 enables a sentence to be extracted from the table.

According to an embodiment of the present invention, when a sentence is extracted from a table, the unit table 41 is referred to, and an appropriate unit can be added to the extracted sentence. FIG. 41 is an example of the unit table 41. The unit table 41 contains a plurality of units in various forms. The unit table 41 having predetermined units registered in advance therein is stored in, for example, the HDD 114. A user may register units in the unit table 41.

At the time when a sentence is extracted from a table, data has been structured into a tree, and each cell has been tagged with a tag. For example, if a cell containing a unit, which is registered in the unit table 41, at the first table row or column, and a cell consisting of numerical information in the subsequent table row or column are repeated, the unit table 41 is referred to, and sentences having a numerical section endowed with the unit in the corresponding row or column can be extracted from the cells. It can be determined according to the extraction mode 42 whether or not a unit is added to a sentence (numerical value) in a cell.

While a unit has been described, the present invention is not limited thereto. For example, a cell may be extracted together with a character string described in the first table row or column. In this case, again, it can be determined according to the extraction mode 42 whether or not the content of cell in the first row or column is added.

Although not clearly illustrated in FIG. 38, an extraction process using the extraction mode 42 may also be performed on other tags, in addition to a table tag.

For example, when text is sequentially extracted, if quotation extraction is enabled in the extraction mode 42, a section tagged with a quotation tag in sentence-structured data is also extracted. If quotation extraction is disabled in the extraction mode 42, however, a sentence can be extracted while ignoring a quoted section. If quotation extraction is enabled in the extraction mode 42, based on a parameter used in a tag indicating a quotation, the tag determining unit 39 determines the type of quotation symbol used.

The process proceeds to step S407, in which it is determined whether or not a user tag defined by a user is contained in the data. According to an embodiment of the present invention, therefore, a user can define a tag, and can allocate a predetermined action to an existing tag and a user-defined tag. A tag defined by a user, and a tag to which a predetermined action is allocated by a user are referred to as a "user tag". An action allocated to a tag by a user is registered in the tag-action-data register 40 as tag action data. The tag action data is stored in, for example, the HDD 114.

FIG. 42 shows example tag action data. As shown in FIG. 42, a predetermined action can be allocated to existing tags in HTML, such as <H> and <TABLE>. Furthermore, a user can define his own tags, such as <USER_01>, <USER_02>, and <USER_03>, and predetermined actions may be allocated to for the predefined tags.

A tag to which an action is allocated may be used in combination with a normal display device to display a sentence with the tag in a style according to variations in attribute, such that the sentence is displayed in a different color, is highlighted, or is underlined on the display device. A tag to which an action is allocated may be used in combination with a text reading aloud apparatus to read aloud a sentence with the tag in a different voice or at a different rate according to variations in attribute.

Taking a tag indicating a heading as an example, a heading section in a document may only be colored, or may be read aloud, or read aloud in a different voice.

In particular, a tag indicating a heading, a tag indicating a quotation, and a tag indicating a paragraph have a significant meaning in the document structure. It is useful on a display device or a text reading aloud apparatus to take predetermined actions on sentences corresponding to these kinds of tags.

Returning to FIG. 38, in step S407, tag action data is referred to by the tag determining unit 39 to check for a sentence tagged with a tag registered in the tag-action-data register 40. If it is determined that there is no sentence tagged with a tag registered in the tag-action-data register 40, the process proceeds to step S409.

If it is determined in step S407 that there is a sentence tagged with a tag registered in the tag-action-data register 40, the process proceeds to step S408, in which an action set for the tag-action-data register 40 is taken on the sentence tagged with that tag.

For example, if a highlighting action is allocated to a tag, a sentence tagged with the tag, the tag, and the action data defined for the tag are passed to the controller 1 via the sentence extractor 36 from the tag determining unit 39. A predetermined display control signal is generated based on the above data by the controller 1, and a display signal based on the display control signal is supplied to the display device 3. This allows the sentence specified by the tag to be highlighted on the display device 3.

In step S409, it is determined whether or not the next sentence is also extracted. If it is determined that the next sentence is not extracted, the process ends. If it is determined that the next sentence is extracted, the process proceeds to step S410, in which it is determined whether or not all sentences to be processed have been completely processed. If all sentences to be processed have been completely processed, the process ends. If any sentence has not been processed, the process returns to step S402.

If any sentence has not been processed in step S410, the process may return to step S404, as indicated by a dotted line in FIG. 38.

Accordingly, in the sentence extractor 36, tree-structured data is generated based on the sentence-structured data, and the tree structure is detected to extract a sentence.

A template stored in the sentence-extraction-template storage 44 is now described.

A template is paired with tree-structured data, and each node is associated with flag information for determining whether or not that node is extracted. According to an embodiment of the present invention, when a sentence is extracted by the sentence extractor 36, a template stored in the sentence-extraction-template storage 44 is used to extract the sentence according to a sentence extraction method specified in the template.

Figure 43:
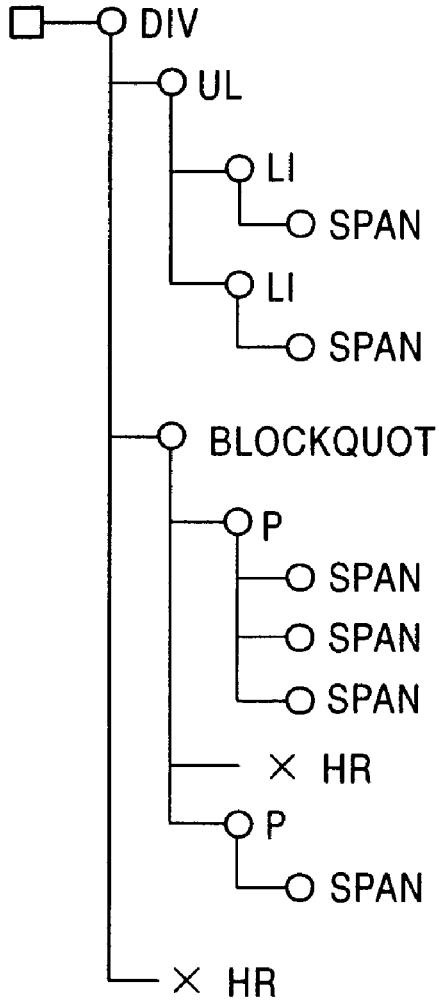
FIG. 43 is a table showing the structure of a template stored in a sentence-extraction-template storage.

FIG. 43 shows the structure of a template stored in the sentence-extraction-template storage 44. In a template, tags added to sentences and the hierarchical structure of the tags are described using each tag as a node, and each node is given a code indicating whether or not the node is extracted. Such a template is generated based on, for example, tree-structured data such that tree is constructed based on the tag information in the tree-structured data and the position information indicating a position relationship between nodes in the tree-structured data.

In the template, a node indicated by "! (circle)" at a tree branch is a node to be extracted, and a node indicated by "((cross)" is a node not to be extracted. The higher a node is in a tree, the higher the priority. A template can be registered by a user from the template register 43. A template may also be prepared in advance and stored in, for example, the HDD 114.

A template may be registered by the template register 43 in the sentence-extraction-template storage 44 in such a manner that the template is associated with an ID unique to data to which that template is adapted. This unique ID is shown as a text ID in FIG. 43. For example, the file name or URL (uniform resource locator) of the text data to which that template is adapted may be used as a text ID. This facilitates a search for a template adaptable to an input text.

In documents whose formats are similar, such as newspaper articles, the same template may be commonly used for the documents. In this case, the file names or URLs of the documents may be possibly similar, and the file name or URL of a document file that is the source of the original template may be used to readily search for a template adaptable to the documents by a fuzzy search described below.

Alternatively, for example, a template specified by a user may be used for input text.

In the template register 43, the flag information in a template for each node may be pointed by the input device 2 on the display device 3. The following two methods for pointing the flag information may be contemplated.

The first method is to point a text image on the display device 3 according to the tree-structured data, as shown in FIG. 44. In FIG. 44, an image of the text to be processed is rendered in two-dimensional manner according to the tree-structured data. As shown in FIG. 44, a predetermined pointing tool, such as a cursor, capable of moving on a screen of the display device 3 as the mouse 121, as the input device 2, moves may be used to point a section to be extracted. In this example, a sentence pointed by a cursor is switched to a non-extraction state by button operation of the mouse 121.

Figure 45:
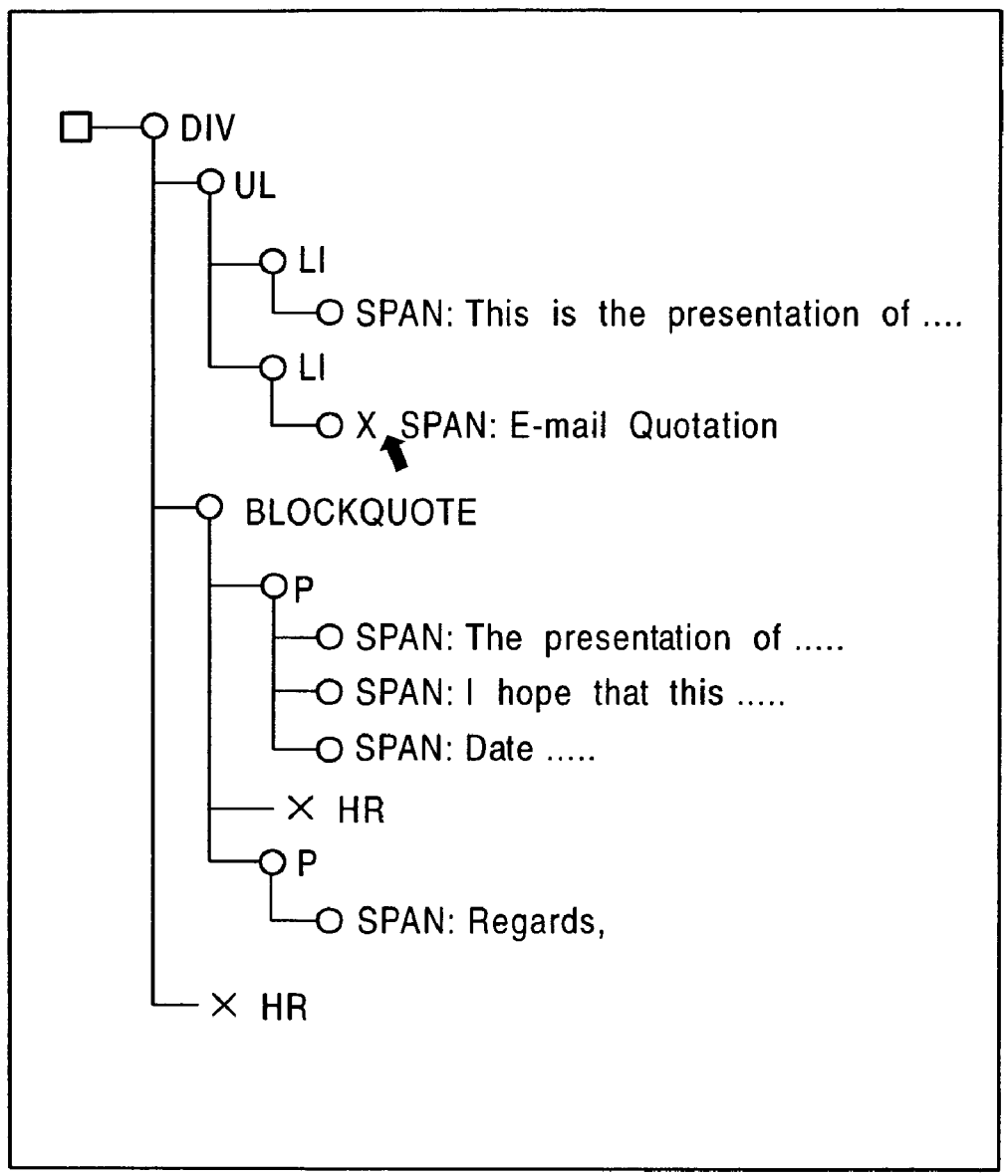
FIG. 45 is a view showing that flag information for a node in a template is pointed.

The second method is to display a tree of the tree-structured data on which a node is pointed, as shown in FIG. 45. In this example, again, a cursor is used to point symbol "! (circle)" or "((cross)" indicating whether or not the sentence on a node is extracted. According to button operation of the mouse 121, the sentence may be switched between an extraction state and a non-extraction state. In FIG. 45, a sentence "E-mail Quotation" tagged with a tag <SPAN> is switched from an extraction state to a non-extraction state.

Referring back to the flowchart of FIG. 38, in step S402, if it is determined that the template is adapted, the process proceeds to step S411. In step S411, it is determined whether or not there is a template adaptable to the data to be currently processed. For example, a predetermined area of the HDD 114 is searched by the template search unit 45 to check for the presence of the template.

If a template is associated with a file name or a URL as described above, the template is verified by the template search unit 45 under control of the controller 1. If the template search mode 46 sets a fuzzy search for the file names or URLs of the templates stored in the sentence-extraction-template storage 44, the template search unit 45 determines that match is found between a character string specified by a search character and the file name or URL to be searched if both do not exactly match, and the template is adapted.

FIG. 46 shows examples of the template search mode 46. In the template search mode 46, items of the template reference mode are specified which are used to search the sentence-extraction-template storage 44 for a template to be adapted. In the example shown in FIG. 46, it is determined whether or not a fuzzy search using a text ID is made in order to search for a template, and, if a fuzzy search is made, the precision of the fuzzy search is determined. It is also determined whether or not a fuzzy adaptation is made in order to adapt a searched extraction template to the data, and, if a fuzzy adaptation is made, the precision of the fuzzy adaptation is determined.

In addition to settings for a text ID or for a search or adaptation condition of a template, as shown in FIG. 46, settings for a template editing mode, automatic saving for a template, template mismatch warning, etc., are specified in the template search mode 46.

FIG. 47 schematically shows an example fuzzy search based on a text ID. In FIG. 47, with respect to a text ID 400 of text data input from the input device 2, a template corresponding to a text ID 401 stored in the sentence-extraction-template storage 44 is searched for. In the template search mode 46, a character string is referred to using a character-string search, such as a forward match search. In the example shown in FIG. 47, 40 bytes of a 49-byte character string of the stored text ID 401 match the text ID 400 of the input text data. In other words, approximately 82% of the character string of the text ID 401 matches the text ID 400, and the precision is 82%.

Since the precision of fuzzy search using a text ID is 70% in the template search mode 46 shown in FIG. 46, it is determined that the text ID 400 matches the text ID 401. Then, the template can be adapted even if match is not exactly found therebetween in terms of the file name or URL.

If a fuzzy search for a text ID is turned "OFF" in the template search mode 46, only when match is exactly found between the text ID 400 of the input text and the text ID 401 stored in the sentence-extraction-template storage 44, a template corresponding to the text ID 401 is adapted.

If a fuzzy adaptation of a template is turned "ON" in the template search mode 46, the template search unit 45 sequentially adapts a template from a higher node in the hierarchy of the tree-structured data. For fuzzy adaptation, an excessive or deficient node in the tree-structured data may be absorbed. The fuzzy adaptation herein may be performed by any technique. For example, the type of tags used, the node position, and the number of tags of the same type may be used as measures of the precision.

If a template fuzzy search is turned "OFF" in the template search mode 46, a template is adapted only when the template matches the tree structure of data to which the template is to be adapted.

Based on the foregoing description with respect to a template, a template-related process shown in FIG. 38 is now described. If it is determined in step S402 that a template is adapted, the process proceeds to step S411, in which it is determined whether or not a template adaptable to the data to be currently processed is stored in the sentence-extraction-template storage 44. The template is search for using the above-described fuzzy search.

If it is determined that the adaptable template is stored in the sentence-extraction-template storage 44, the process proceeds to step S412, in which the searched template is adapted to the data to be processed, for example, using the above-described fuzzy adaptation. After template adaptation, the process proceeds to step S413.

If it is determined in step S411 that the adaptable template is not stored in the sentence-extraction-template storage 44, the process proceeds to step S414. In step S414, a new template is created. For example, a new template is created by the method described with reference to FIG. 44 or 45 based on the tree-structured data of the document data to be currently processed. The new template may be stored in the sentence-extraction-template storage 44. After a template is created, the process proceeds to step S413.

In step S413, it is determined whether or not the data to be process contains a node for extraction according to the template. If it is determined that a node for extraction is present, the process proceeds back to step S403, in which a sentence is extracted. If it is determined that a node for extraction is absent, the process proceeds to step S409, in which it is determined whether or not the next sentence is extracted.

Accordingly, sections to be extracted and the other sections in text are pointed using a template. Since a fuzzy search is used to search for a template, the template may be adapted to the time-varying content such as the content which is refreshed on the Internet, while keeping tack of the content when the template is stored or reused.

While the document processing apparatus 300 according to the present invention is implemented in software running on, for example, a personal computer in the foregoing description, the present invention is not limited thereto. The document processing apparatus 300 may be incorporated into other apparatuses. As an example, the document processing apparatus 300 together with a tool for providing an audio output in a synthetic voice according to text information may be incorporated in a robotic apparatus, thus achieving an advantage as if the robotic apparatus read aloud an e-mail message or text on a home page (web site) on the Internet.

In this case, the document apparatus 300 according to the present invention may be combined with a predetermined computer-manipulated mechanism, thereby setting an action according to tag action data.

Furthermore, the document processing apparatus 300 according to the present invention may be used for services on a network such as the Internet. Text on a typical home page which is publicly accessible on the Internet may be segmented into sentences, before being transmitted to a personal computer accessed thereto. As an application, a service may also be contemplated in which voices are synthesized according to text extracted from a typical home page (web site) and the resulting audio output is transmitted to a cellular telephone device.

Furthermore, in a network, the components shown in FIG. 2 may be distributed into a plurality of servers, and the components distributed on the plurality of servers may be integrally processed. In this case, the input device 2 may be a cellular telephone device.

As described above, according to the present invention, input text data is divided into blocks based on character patterns in the data, and the blocks are tagged with a tag indicating a block. The data divided into blocks is converted into structured data which is structured according to the tags indicating a block. The structured data is then structured into a tree, and sentences are extracted from the tree-structured data.

According to the present invention, therefore, advantageously, text data can be controlled such that text is extracted without a quotation symbol in an e-mail message or elements in text, such as a table expressed by character-based ruled lines, are extracted.

According to an embodiment of the present invention, advantageously, text in a plain text format, text in a tagged text format, and text in an e-mail format, which are typically processed by separate processors, may be unitarily presented and processed by a single processor. This advantageously makes a simplified system for document processing.

According to an embodiment of the present invention, advantageously, sections to be extracted from tagged text and the other sections, which are typically processed manually because they cannot be determined only by tags, may be specified with ease.

The present invention may advantageously be used for pre-processing of a system for reading aloud text in a synthetic voice, thereby achieving a system capable of readily reading aloud an e-mail message or a home page (web site) on the Internet.

Accordingly, the present invention can provide various advantages for the overall text processing art.

What is claimed is:

1. A document processing apparatus comprising:
    block dividing means for dividing input document data into blocks in a predetermined manner according to the structure of the document data;
    document structuring means for structuring the document data by parsing a block into which the document data is divided by said block dividing means according to the document structure of the block, and by adding tag information to text data constituting the block, said tag information indicating an attribute of the text data;
    storing means for storing an extraction mode for determining whether or not a sentence is extracted with respect to a tag information added to text data; and
    sentence extraction means for controlling an extraction of the text data according to the tag information added to the text data by said document structuring means and said extraction mode stored in said storing means, wherein said sentence extraction means further includes tag determining means for taking an action according to the tag information, and said tag determining means determines a type of tag information for the text data tagged with tag information according to the tag information and tag action data including action data indicating an action associated with the tag information, and takes the action set for the tag action data.

2. A document processing apparatus according to claim 1, wherein said block dividing means outputs block-structured data, said block-structured data being tagged with predetermined tag information indicating the blocks into which the document data has been divided by said block dividing means, and
    said document structuring means processes said block-structured data.

3. A document processing apparatus according to claim 1, wherein the input document data is generated by an external device, and said document structuring means processes block-structured data, said block-structured data being tagged with predetermined tag information indicating the blocks into which the document data has been divided by said block dividing means.

4. A document processing apparatus according to claim 1, wherein said document structuring means outputs sentence-structured data, said sentence-structured data being tagged with predetermined tag information indicating the document data which has been structured by said document structuring means, and
    said sentence extraction means processes said sentence-structured data.

5. A document processing apparatus according to claim 1, wherein the input document data is generated by an external device, and said sentence extraction means processes sentence-structured data, said sentence-structured data being tagged with predetermined tag information indicating the document data which has been structured by said document structuring means.

6. A document processing apparatus according to claim 1, further comprising:
    text-format determining means for determining a text format type of the input document data,
    wherein a document data output from said text-format determining means is input to said block dividing means.

7. A document processing apparatus according to claim 6, wherein said block dividing means identifies a blank line as a block break when it is determined by said text-format determining means that the input document data is in a text format.

8. A document processing apparatus according to claim 6, wherein said block dividing means identifies, as the block, a group of lines having a same number of characters when it is determined by said text-format determining means that the input data is in a text format.

9. A document processing apparatus according to claim 6, wherein said block dividing means identifies, as the block, a group of lines whose character string starts at a same position when it is determined by said text-format determining means that the input data is in a text format.

10. A document processing apparatus according to claim 6, wherein said block dividing means identifies, as the block, a section enclosed by a predefined character string for a ruled line when it is determined by said text-format determining means that the input data is in a text format.

11. A document processing apparatus according to claim 10, further comprising ruled-line character registering means which allows a user to register the character string for a ruled line.

12. A document processing apparatus according to claim 6, wherein said block dividing means identifies a series of predefined characters or character strings as a ruled line, and identifies a section enclosed by the ruled line as the block when it is determined by said text-format determining means that the input data is in a text format.

13. A document processing apparatus according to claim 12, further comprising continuous-character-based ruled-line character registering means which allows a user to register the series of characters or character strings which is identified as a ruled line.

14. A document processing apparatus according to claim 12, further comprising continuous-character-number specifying means for specifying a number of characters or character strings which continuously appear to form a ruled line.

15. A document processing apparatus according to claim 6, wherein said block dividing means identifies, as a block break, a break at a predefined character string for a horizontal rule when it is determined by said text-format determining means that the input document data is in a text format.

16. A document processing apparatus according to claim 15, further comprising horizontal-rule character registering means which allows a user to register the character string for a horizontal rule.

17. A document processing apparatus according to claim 6, wherein said block dividing means stores a character position of original text as the tag information when it is determined by said text-format determining means that the input document data is in a text format.

18. A document processing apparatus according to claim 6, wherein said block dividing means identifies, as the block, a section specified by a function tag indicating a comment or a document type when it is determined by said text-format determining means that the input document data is in a tagged text format.

19. A document processing apparatus according to claim 1, further comprising text-format determining means including:

decoding means which determines an encoding method of the input document data to decode the document data; and converting means for converting a character coding of the document data which is provided from said decoding means into a predetermined character coding, wherein the document data whose character coding has been converted into the predetermined character coding by said converting means is input to said block dividing means.

20. A document processing apparatus according to claim 19, wherein said text-format determining means further includes character-coding specifying means for specifying a processed character coding, and selects the character coding in place of the predetermined character coding.

21. A document processing apparatus according to claim 20, wherein the document processing apparatus processes the document data according to an original character coding if said character-coding specifying means does not specify a character coding.

22. A document processing apparatus according to claim 1, wherein said document structuring means further includes blank line determining means which identifies a blank line in the block as a sentence break to segment the block into sentences.

23. A document processing apparatus according to claim 1, wherein said document structuring means further includes quotation-mark determining means for checking for matching of quotation marks in the block, for referring to one or a plurality of blocks before and after the block if the quotation marks do not match, and for, if the quotation marks in the blocks match, restructuring the blocks in which the quotation marks match into a single block.

24. A document processing apparatus according to claim 1, wherein said document structuring means further includes paragraph determining means for checking for a paragraph break based on a position at which a line of the block starts, and for adding tag information indicating a paragraph to a section of a paragraph.

25. A document processing apparatus according to claim 1, wherein said document structuring means further includes paragraph determining means for determining a paragraph break based on a position at which a line of the block starts and based on a number of characters in the line, and for adding tag information indicating a paragraph to a section of a paragraph.

26. A document processing apparatus according to claim 1, wherein, when the input document data is in a predetermined tagged text format, the input document data being tagged with tag information specifying the document structure, said document structuring means uses the tag information.

27. A document processing apparatus according to claim 1, wherein said document structuring means further includes English-text determining means for determining whether or not text in the block is in English, and for, if the text is in English, segmenting the English text into sentences such that a line is continued to a next line if a hyphen is inserted at an end of the line and a line is continued to the next line with a white space inserted therebetween if no hyphen is inserted at the end of the line and if the line does not end with a delimiter.

28. A document processing apparatus according to claim 1, wherein said document structuring means segments the block into sentences based on a period used as a sentence break.

29. A document processing apparatus according to claim 1, wherein said sentence extraction means expresses the document data, which is structured according to the tag information generated by said document structuring means, as tree-structured data.

30. A document processing apparatus according to claim 1, wherein said sentence extraction means expresses the document data, which is structured according to the tag information generated by said document structuring means, as tree-structured data, and controls an extraction of the text data according to the tag information added to the tree-structured data.

31. A document processing apparatus according to claim 1, wherein said sentence extraction means expresses the document data, which is structured according to the tag information generated by said document structuring means, as tree-structured data, and controls movement of an objective point on the document according to the tag information added to the tree-structured data.

32. A document processing apparatus according to claim 1, wherein said sentence extraction means expresses the document data, which is structured according to the tag information generated by said document structuring means, as tree-structured data, and extracts the text data row-by-row according to the tree-structured data when the tag information added to the tree-structured data indicates a table.

33. A document processing apparatus according to claim 1, wherein said sentence extraction means expresses the document data, which is structured according to the tag information generated by said document structuring means, as tree-structured data, and extracts the text data column-by-column according to the tree-structured data when the tag information added to the tree-structured data indicates a table.

34. A document processing apparatus according to claim 1, wherein said sentence extraction means expresses the document data, which is structured according to the tag information generated by said document structuring means, as tree-structured data, and, when the tag information added to the tree-structured data indicates a table having a numerical unit at a first row or column and having numerical information at a subsequent respective row or column, extracts the text data with the numerical unit added to the numerical information.

35. A document processing apparatus according to claim 1, wherein said sentence extraction means expresses the document data, which is structured according to the tag information generated by said document structuring means, as tree-structured data, and, when the tag information added to the tree-structured data indicates a table having a numerical unit at a first row or column and having numerical information at a subsequent respective row or column, explicitly directs to extract the text data with the numerical unit added to the numerical information.

36. A document processing apparatus according to claim 1, wherein said sentence extraction means expresses the document data, which is structured according to the tag information generated by said document structuring means, as tree-structured data, and, when the tag information added to the tree-structured data indicates a table, extracts the text data with the text data at a first column or row in the table added to the text data in a subsequent respective column or row.

37. A document processing apparatus according to claim 1, wherein said sentence extraction means expresses the document data, which is structured according to the tag information generated by said document structuring means, as tree-structured data, and, when the tag information added to the tree-structured data indicates a table, explicitly directs to extract the text data with the text data at a first column or row in the table added to the text data in a subsequent respective column or row.

38. A document processing apparatus according to claim 1, wherein said sentence extraction means extracts the document data, which is structured according to the tag information generated by said document structuring means, as tree-structured data, and determines whether or not a quoted section is extracted when the tag information added to the tree-structured data indicates a quotation.

39. A document processing apparatus according to claim 1, wherein said sentence extraction means expresses the document data, which is structured according to the tag information generated by said document structuring means, as tree-structured data, and extracts the text data paragraph-by-paragraph using tag information added to the tree-structured data which indicates a paragraph.

40. A document processing apparatus according to claim 1, wherein said sentence extraction means expresses the document data, which is structured according to the tag information generated by said document structuring means, as tree-structured data, and extracts the text data heading-by-heading using tag information added to the tree-structured data which indicates a heading.

41. A document processing apparatus according to claim 1, wherein the tag action data is registered by a user.

42. A document processing apparatus according to claim 1, wherein said sentence extraction means expresses the document data, which is structured according to the tag information generated by said document structuring means, as tree-structured data, and includes a sentence-extraction template which is paired with the tree-structured data in which each node is associated with an extraction control flag, and
   if the extraction control flag prohibits extraction of the text data, said sentence extraction means does not extract the text data flagged with the extraction control flag.

43. A document processing apparatus according to claim 1, wherein the predetermined condition comprises an indication that an extraction mode be utilized by said sentence extraction means for controlling the extraction of the text data.

44. A document processing apparatus according to claim 1, wherein the predetermined condition comprises an indication that tag action data be utilized by said sentence extraction means for controlling the extraction of the text data.

45. A document processing apparatus according to claim 1, wherein the structured data comprises sentence-structured data.

46. A document processing apparatus according to claim 1, wherein the structured data comprises tree-structured data.

47. A computer-implemented document processing method comprising the steps of:
   dividing input document data into blocks in a predetermined manner according to a structure of the document data;
   structuring the document data, thereby generating structured data, by parsing a block into which the document data is divided in said block dividing step according to a document structure of the block, and by adding tag information to text data constituting the block, said tag information indicating an attribute of the text data;
   controlling an extraction of the text data according to the added tag information and a predetermined condition, wherein the predetermined condition provides an indication of a method to be utilized to perform the extraction of the text data;
   determining a type of tag information for the text data tagged with tag information and tag action data including action data indicating an action associated with the tag information; and
   taking the action associated with the tag information.

48. A document processing program for causing a computer apparatus to execute a document processing method comprising the steps of:
   dividing input document data into blocks in a predetermined manner according to a structure of the document data;
   structuring the document data, thereby generating structured data, by parsing a block into which the document data is divided in said block dividing step according to a document structure of the block, and by adding tag information to text data constituting the block, said tag information indicating an attribute of the text data;
   controlling an extraction of the text data according to the added tag information and a predetermined condition, wherein the predetermined condition provides an indication of a method to be utilized to perform the extraction of the text data;
   determining a type of tag information for the text data tagged with tag information and tag action data including action data indicating an action associated with the tag information; and
   taking the action associated with the tag information.

49. a non-transitory computer-readable recording storage medium having a document processing program recorded thereon, the document processing program, when executed, causing a computer apparatus to execute a document processing method comprising the steps of:
   dividing input document data into blocks in a predetermined manner according to a structure of the document data;
   structuring the document data, thereby generating structured data, by parsing a block into which the document data is divided in said block dividing step according to a document structure of the block, and by adding tag information to text data constituting the block, said tag information indicating an attribute of the text data;
   controlling an extraction of the text data according to the added tag information and a predetermined condition, wherein the predetermined condition provides an indication of a method to be utilized to perform the extraction of the text data.
   determining a type of tag information for the text data tagged with tag information and tag action data including action data indicating an action associated with the tag information; and
   taking the action associated with the tag information.

50. A document processing apparatus according to claim 1, wherein the predetermined condition comprises an indication that a template be utilized by said sentence extraction means for controlling the extraction of the text data.

* * * * *